United States Patent
Kim et al.

(10) Patent No.: US 6,807,221 B1
(45) Date of Patent: Oct. 19, 2004

(54) CHANNEL SPREADING DEVICE AND METHOD FOR CDMA COMMUNICATION SYSTEM

(75) Inventors: Jae-Yoel Kim, Kunpo-shi (KR); Young-Ky Kim, Seoul (KR); Hee-Won Kang, Seoul (KR); Seung-Joo Maeng, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/442,379

(22) Filed: Nov. 17, 1999

(30) Foreign Application Priority Data

Nov. 17, 1998 (KR) ........................................ 1998-49863
Nov. 17, 1998 (KR) ........................................ 1998-50278

(51) Int. Cl.$^7$ .............................................. H04B 1/707
(52) U.S. Cl. ................................................... 375/140
(58) Field of Search ............................... 375/140, 146, 375/147, 141; 455/552, 575

(56) References Cited

U.S. PATENT DOCUMENTS

| | | | |
|---|---|---|---|
| 5,309,474 A | 5/1994 | Gilhousen et al. | |
| 6,223,053 B1 * | 4/2001 | Friedmann et al. | 455/552 |
| 6,307,877 B1 * | 10/2001 | Philips et al. | 375/130 |

FOREIGN PATENT DOCUMENTS

| | | |
|---|---|---|
| JP | 2003-520457 | 2/2003 |
| JP | 2004-500725 | 1/2004 |
| WO | WO 99/49586 | 9/1999 |
| WO | WO 99/046887 | 9/1999 |

OTHER PUBLICATIONS

Japanese Office Action dated Jan. 20, 2004 issued in a counterpart application, namely, Appln. No. 2000-583185.
First Office Action of The Patent Office of the People's Republic of China dated Aug. 2, 2002 issued in a counterpart application, namely Chinese Appln. No. 99815127.0.

* cited by examiner

*Primary Examiner*—Stephen Chin
*Assistant Examiner*—Kevin Kim
(74) *Attorney, Agent, or Firm*—Dilworth & Barrese LLP

(57) ABSTRACT

A channel spreading device for a base station in a CDMA communication system is described. The device comprises a spreading code generator for generating a real-component spreading code and an imaginary-component spreading code corresponding to a designated channel spreading code index; a circuit receiving a mode control signal, for disabling generation of the imaginary-component spreading code when the received mode control signal indicates a BPSK (Binary Phase Shift Keying) modulation mode; and a complex multiplier receiving a channel signal, for complex multiplying the received channel signal by the spreading codes to spread the channel signal.

13 Claims, 19 Drawing Sheets

| SPREADING CODE INDEX | MASK INDEX | WALSH ORTHO CODE INDEX |
|---|---|---|
| 0 ⋮ 127 | 0 ⋮ 0 | 0 ⋮ 127 |
| 128 ⋮ 255 | 1 ⋮ 1 | 0 ⋮ 127 |
| ⋮ | ⋮ | ⋮ |
| N x 128 ⋮ ((N+1) x 128) − 1 | N ⋮ N | 0 ⋮ 127 |

FIG.15

| SPREADING CODE INDEX | I-COMPO-NENT MASK INDEX* | Q-COMPO-NENT MASK INDEX* | WALSH ORTHO CODE INDEX |
|---|---|---|---|
| 0 ⋮ 127 | 0 ⋮ 0 | 0 ⋮ 0 | 0 ⋮ 127 |
| 128 ⋮ 255 | 1 ⋮ 1 | 1 ⋮ 1 | 0 ⋮ 127 |
| ⋮ | ⋮ | ⋮ | ⋮ |
| N x 128 ⋮ ((N+1) x 128) − 1 | N ⋮ N | N ⋮ N | 0 ⋮ 127 |
| (N+1) x 128 ⋮ (N+2) x 127 | 0 ⋮ 0 | T ⋮ T | 0 ⋮ 127 |

FIG.16

CHANNEL SPREADING DEVICE AND METHOD FOR CDMA COMMUNICATION SYSTEM

PRIORITY

This application claims priority to an application entitled "Channel Spreading Device and Method for CDMA Communication System" filed in the Korean Industrial Property Office on Nov. 17, 1998 and assigned Serial No. 98-49863, the contents of which are hereby incorporated by reference.

BACKGROUND OF THE INVENTION

1. Field of the Invention

The present invention relates generally to a spreading device and method for a CDMA communication system, and in particular, to a device and method for spreading channels by complex spreading.

2. Description of the Related Art

In general, CDMA (Code Division Multiple Access) communication systems use orthogonal codes for channel separation in order to increase channel capacity. Such a channel separation method using orthogonal codes is typically applied to an IS-95/IS-95A forward link, and can also be applied to a reverse link through time alignment.

However, since future IMT-2000 CDMA communication systems and existing IS-95 CDMA communication systems use different modulation and demodulation methods when orthogonally spreading and despreading signals, there is a compatibility problem between the two systems. The new IMT-2000 systems are capable of several different transmission rates: 1× (which bandwidth corresponds to the present IS-95 system), 3× (which is three times the bandwidth), 6× (six times the bandwidth), 9× (nine times the bandwidth), and 12× (twelve times the bandwidth). IMT-2000 systems of 3× or higher use QPSK (Quadrature Phase Shift Keying) modulation and demodulation for generating orthogonally spread and despread signals, whereas the IS-95 system (and the 1× IMT-2000 system) uses BPSK (Binary Phase Shift Keying) modulation and demodulation for generating the orthogonally spread and despread signals. Herein, these orthogonal codes are assumed to be Walsh codes.

This disparity in modulation results in the base stations and mobile stations of one system not being able to communicate with the base stations and mobile stations of the other. This disparity will be described with reference to numerical formulas. When a base station transmitter has orthogonally spread input signals dI and dQ by QPSK modulation using an orthogonal code, i.e., a Walsh orthogonal code Wk, before transmission, a receiver using QPSK demodulation despreads received signals XI and XQ as expressed in Equation (1). When a system using BPSK orthogonal modulation has spread the input signals dI and dQ using the Walsh orthogonal code Wk, a receiver using BPSK demodulation despreads the received signals XI and XQ as expressed in Equation (2).

$$\frac{1}{2}(X_I + jX_Q)(W_k - jW_k) = \tag{1}$$

$$\frac{1}{2}(d_I + jd_Q)(W_k + jW_k)(W_k - jW_k) = (d_I + jd_Q)$$

$$(X_I + jX_Q)W_k = (d_I + jd_Q)W_k W_k = (d_I + jd_Q) \tag{2}$$

Therefore, because the two systems use different modulation and demodulation methods for generating orthogonal spreading and despreading signals, the two systems are incompatible, disabling communication between them. That is, IS-95 mobile stations (and 1× mobile stations of the IMT-2000 system) cannot communicate with an over-3× base station of the IMT-2000 system, and the over-3× IMT-2000 mobile stations cannot communicate with an IS-95 base station. To be exact, when a base-station transmits a signal spread by QPSK modulation and then a mobile station despreads the channel spread signal by BPSK demodulation, the relationship between the input and output of the mobile station demodulator can be expressed as:

$$\frac{1}{2}(X_I + jX_Q)W_k = \tag{3}$$

$$\frac{1}{2}(d_I + jd_Q)(W_k + jW_k)W_k = (d_I - jd_Q) + j(d_I + jd_Q)$$

Equation (3) demonstrates that when the base station orthogonally spreads a transmission signal by QPSK modulation before transmission and the mobile station despreads the spread signal by BPSK demodulation, the signal demodulated by the mobile station by QPSK demodulation becomes not $d_I + jd_Q$, but $(d_I - jd_Q) + j(d_I + jd_Q)$. Therefore, when the QPSK modulated signal undergoes BPSK demodulation, communication cannot be performed between the base station and the mobile station. Alternatively, communication cannot also be performed between a base station which spreads a channel by BPSK modulation and a mobile station which despreads the spread channel by QPSK demodulation.

However, it is necessary to maintain backwards compatibility so that the existing IS-95 mobile stations can be provided with communication services even when the future IMT-2000 CDMA communication system is being implemented, so that the mobile stations of the IMT-2000 system can communicate with the base stations of the IS-95 system.

FIG. 1 shows the IS-95/IS-95A forward link in which channels are separated by Walsh orthogonal codes. Referring to FIG. 1, channels are separated by unique Walsh orthogonal codes Wi (where i=0 to 63), respectively. The IS-95/IS-95A forward link uses rate R=1/2 convolutional codes for channel coding, employs BPSK modulation for spreading the Walsh orthogonal codes, and has a bandwidth of 1.2288 MHz. Accordingly, the number of available channels is 1.2288 MHz/(9.6 KHz*2)=64. That is, the IS-95/IS-95A forward link can separate 64 channels using the Walsh orthogonal codes.

Therefore, the number of available Walsh orthogonal codes is dependent on the employed modulation method arid the minimum data rate. However, future CDMA mobile communication systems will require a greater number of channels assigned to users in order to improve performance. To this end, future CDMA mobile communication systems will employ traffic channels, pilot channels and control channels, thereby increasing channel capacity.

However, there are a limited number of available orthogonal codes available for use. This limitation will restrict the increase in channel capacity. To overcome this disadvantage, it is desirable to generate quasi-orthogonal codes, which will limit interference with the orthogonal codes and have a variable data rite. The quasi-orthogonal code is disclosed in detail in Korean patent application No. 97-47457, filed by the applicant, and a complex quasi-orthogonal code is disclosed in Korean patent application No. 98-37453, also filed by the applicant.

In order to perform orthogonal spreading and despreading using the complex quasi-orthogonal sequence, the IMT- 2000 CDMA communication system using the quasi-orthogonal code of the complex quasi-orthogonal sequence employs QPSK orthogonal modulation. Thus, when the Walsh orthogonal codes undergo QPSK modulation, the spreading scheme for specific common channels such as pilot channels and sync channels cannot maintain backward compatibility with the existing IS-95 system employing BPSK modulation.

SUMMARY OF THE INVENTION

It is, therefore, an object of the present invention to provide a spreading device and method for enabling communication between a base station and a mobile station having different channel spreading and despreading schemes in a CDMA communication system.

It is another object of the present invention to provide a device and method for selectively performing orthogonal spreading by QPSK modulation or BPSK modulation in a CDMA communication system.

It is further another object of the present invention to provide a device and method for enabling a base station to perform orthogonal spreading on a specific channel by BPSK modulation and perform orthogonal spreading on other channels by QPSK modulation in a CDMA communication system.

It is yet another object of the present invention to provide a device and method for enabling a mobile station to perform orthogonal despreading on a specific channel by BPSK demodulation and perform orthogonal despreading on other channels by QPSK demodulation in a CDMA communication system.

It is yet another object of the present invention to provide a device and method for enabling a base station to perform orthogonal spreading on a specific channel by BPSK modulation and perform orthogonal spreading on other channels by QPSK modulation, and enabling a mobile station to perform orthogonal despreading on a specific channel by BPSK demodulation and perform orthogonal despreading on other channels by QPSK demodulation in a CDMA communication system.

It is still another object of the present invention to provide an orthogonal spreading device and method wherein channel transmitters include a BPSK orthogonal spreader and a QPSK orthogonal spreader to selectively spread transmission signals by BPSK modulation or QPSK modulation in a CDMA communication system.

It is still another object of the present invention to provide an orthogonal despreading device and method wherein channel receivers include a BPSK orthogonal despreader and a QPSK orthogonal despreader to selectively despread received signals by BPSK demodulation or QPSK demodulation in a CDMA communication system.

It is still another object of the present invention to provide a device and method wherein channel transmitters include an orthogonal spreader for orthogonally spreading transmission signals by BPSK modulation using a Walsh orthogonal code and an orthogonal spreader for orthogonally spreading transmission signals by QPSK modulation using a Walsh orthogonal code or a quasi-orthogonal code, thereby to selectively spread the transmission signals by BPSK modulation or QPSK modulation in a CDMA communication system.

It is still another object of the present invention to provide a device and method wherein channel receivers include an orthogonal despreader for orthogonally despreading spread signals by BPSK demodulation using a Walsh orthogonal code and an orthogonal despreader for orthogonally despreading spread signals by QPSK demodulation using a Walsh orthogonal code or a quasi-orthogonal code, thereby to selectively despread the spread signals by BPSK demodulation or QPSK demodulation in a CDMA communication system.

To achieve the above and other objects, there is provided a channel spreading device for a base station in a CDMA communication system. The device comprises a spreading code generator for generating a real-component spreading code and an imaginary-component spreading code corresponding to a designated channel spreading code index; a circuit receiving a mode control signal, for disabling generation of the imaginary-component spreading code when the received mode control signal indicates the BPSK (Binary Phase Shift Keying) modulation mode; and a complex multiplier receiving a channel signal, for complex multiplying the received channel signal by the spreading codes to spread the channel signal.

The spreading code generator comprises a controller for generating a quasi-orthogonal code mask index and a Walsh orthogonal code index corresponding to the designated channel spreading code index; a real-component spreading code generator for generating a real-component quasi-orthogonal code mask corresponding to the quasi-orthogonal code mask index, generating a real-component Walsh orthogonal code corresponding to the Walsh orthogonal code index, and generating a real-component channel spreading code by multiplying the real-component quasi-orthogonal code mask by the real-component Walsh orthogonal code; an imaginary-component spreading code generator for generating an imaginary-component quasi-orthogonal code mask corresponding to the quasi-orthogonal code mask index, generating an imaginary-component Walsh orthogonal code corresponding to the Walsh orthogonal code index, and generating an imaginary-component channel spreading code by multiplying the imaginary-component quasi-orthogonal code mask by the imaginary-component Walsh orthogonal code.

BRIEF DESCRIPTION OF THE DRAWINGS

The above and other objects, features and advantages of the present invention will become more apparent from the following detailed description when taken in conjunction with the accompanying drawings in which:

FIG. 15 is a diagram illustrating a table for storing mask indexes and Walsh orthogonal code indexes corresponding to spreading code indexes according to an embodiment of the present invention;

FIG. 16 is a diagram illustrating a table for storing mask indexes and Walsh orthogonal code indexes corresponding to spreading code indexes for generating I-component and Q-component spreading codes according to an embodiment of the present invention;

DETAILED DESCRIPTION OF THE PREFERRED EMBODIMENT

Figure 1:
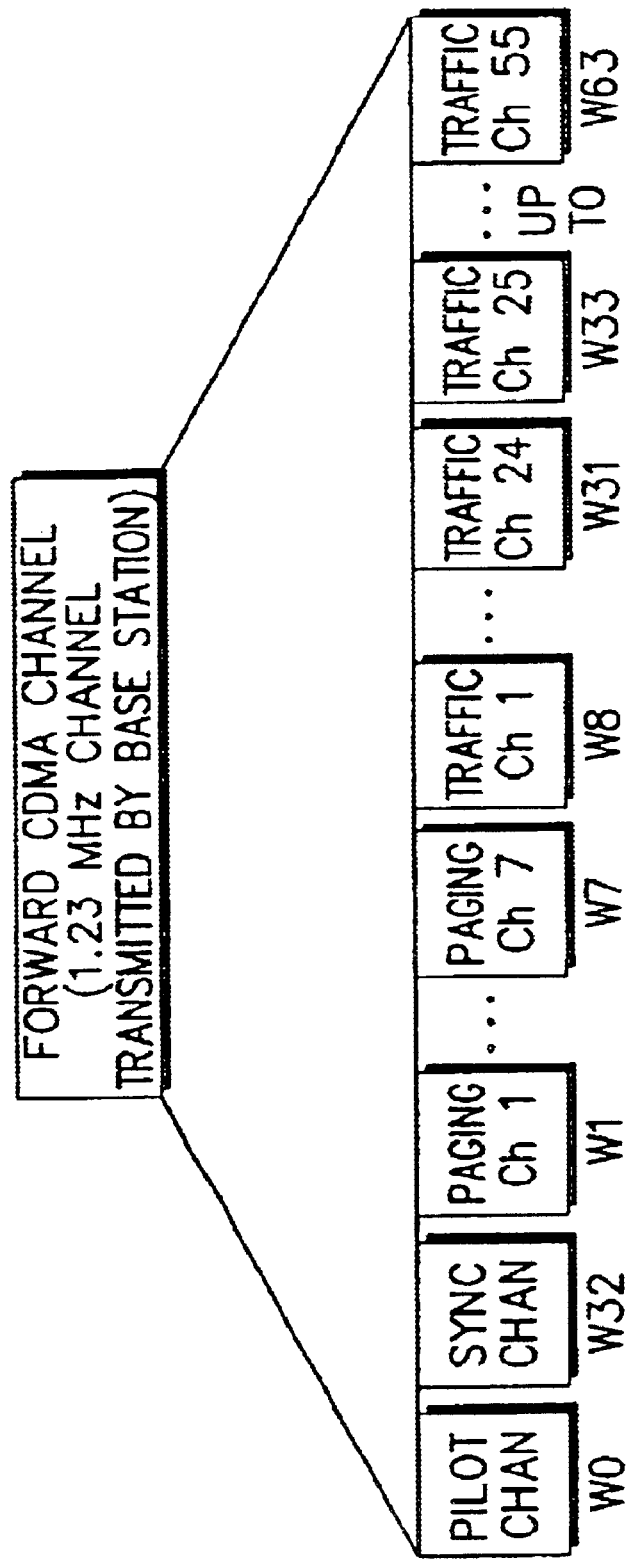
FIG. 1 is a diagram illustrating a forward link for a conventional CDMA communication system.

Preferred embodiments of the present invention will be described herein below with reference to the accompanying drawings. In the following description, well-known functions or constructions are not described in detail since they would obscure the invention in unnecessary detail.

In the following description, the terms "orthogonal spreading" and "channel spreading" will be used interchangeably, and the terms "PN spreading" and "spreading" will also be used interchangeably. The term "spreading code" covers the terms "Walsh orthogonal code" and "quasi-orthogonal code", and the term "orthogonal code index" refers to both a Walsh orthogonal code index and a quasi-orthogonal code mask index used in index tables for creating a Walsh orthogonal code and a quasi-orthogonal code, respectively. Further, the term "first spreading code" refers to a real-component spreading code and the term "second spreading code" refers to an imaginary-component spreading code.

Further, in the following description, a system performing orthogonal spreading and despreading by QPSK modulation and demodulation will be referred to as an "IMT-2000 system", and a system performing orthogonal spreading and despreading by BPSK modulation and demodulation will be referred to as an "IS-95 system".

In an embodiment of the present invention, with regard to the channel structure, a "specific channel" includes the channels requiring backward compatibility with the IS-95 system, such as the pilot channel, the sync channel and the paging channels, and it is assumed that such specific channels have a BPSK spreading scheme. In addition, the channels other than the specific channels, which do not require backward compatibility with the IS-95 system, will be referred to as "non-specific channels", and it is assumed that such non-specific channels have a QPSK spreading scheme. The non-specific channels include the dedicated control channel, the dedicated supplemental channel, and the common channel proposed for the IMT-2000 system.

In addition, since the IS-95 system performs channel spreading by BPSK modulation using a Walsh orthogonal code, an embodiment of the present invention will also be described on the assumption that channel spreading is performed by BPSK modulation using a Walsh orthogonal code. Further, for channel spreading by QPSK modulation, a Walsh orthogonal code or a quasi-orthogonal code is selectively used. Therefore, an orthogonal spreader according to the present invention can perform orthogonal spreading by either BPSK or QPSK modulation, and in addition, can selectively use a Walsh orthogonal code or a quasi-orthogonal code as the channel spreading code when performing orthogonal spreading by QPSK modulation.

A. First Embodiment

With regard to the channel structure, a CDMA communication system according to a first embodiment of the present invention has a BPSK spreading scheme for the channels requiring backward compatibility with the IS-95 system, and has a QPSK spreading scheme for the other channels not requiring backward compatibility.

Figure 6:
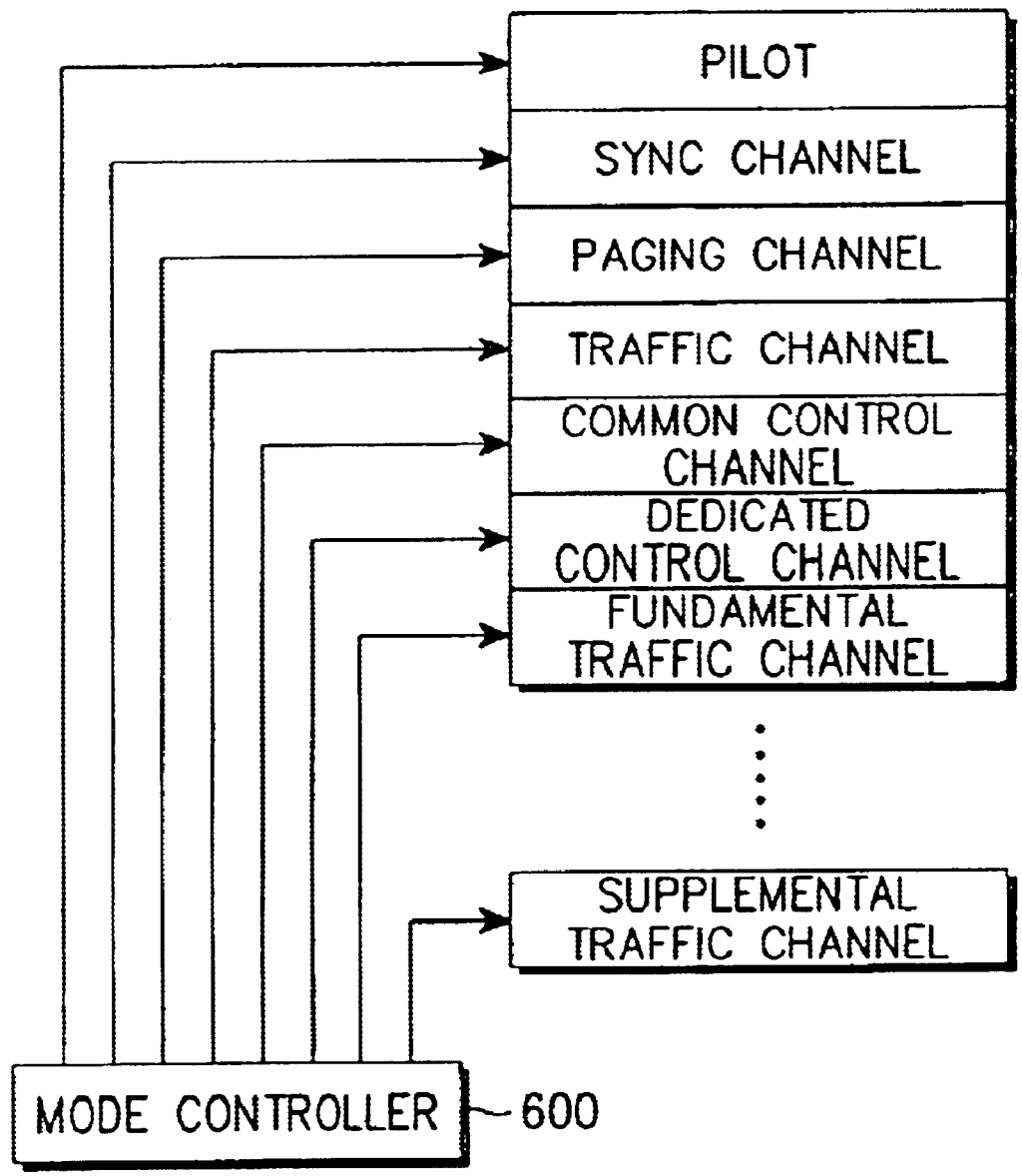
FIG. 6 is a diagram illustrating transmission channel devices for a forward link, wherein the channels requiring backward compatibility with the IS-95 communication system use a BPSK orthogonal spreading mode and other channels use a QPSK orthogonal spreading mode according to an embodiment of the present invention in a CDMA communication system.

FIG. 6 shows various channels used in a forward link of a CDMA communication system according to a first embodiment of the present invention.

Referring to FIG. 6, the channels used in the forward link of the IMT-2000 system include a pilot channel, a sync channel, a paging channel, a traffic channel, a common channel, a dedicated control channel, a fundamental channel and a supplemental channel. The pilot channel, the sync channel, the paging channel and the traffic channel are used in the IS-95 system, while the other channels are newly proposed for the IMT-2000 system. Therefore, the "specific channels" include some or all of the channels used in the IS-95 system, and the "non-specific channels" include the other channels.

Herein, with regard to the forward channel structure, the specific channels requiring backward compatibility with the IS-95 system use a BPSK spreading scheme, and the other channels use a QPSK spreading scheme.

Referring to FIG. 6, all the channels are connected to a mode controller 600, which determines whether or not a base station is presently in communication with IS-95 mobile stations, to designate a proper spreading scheme to the respective channels. At this point, whether or not the base station is in communication with the IS-95 mobile stations can be recognized through a field indicating the mobile station type (IS-95 mobile station or IMT-2000 mobile station) or a field indicating a version of the mobile station, included in an access request message transmitted from the mobile station to the base station. Control signals of the mode controller 600 include a select signal SEL for separating a channel signal into a real-component signal and an imaginary-component signal, and mode control signals for determining a spreading mode of the respective transmitters.

Figure 7:
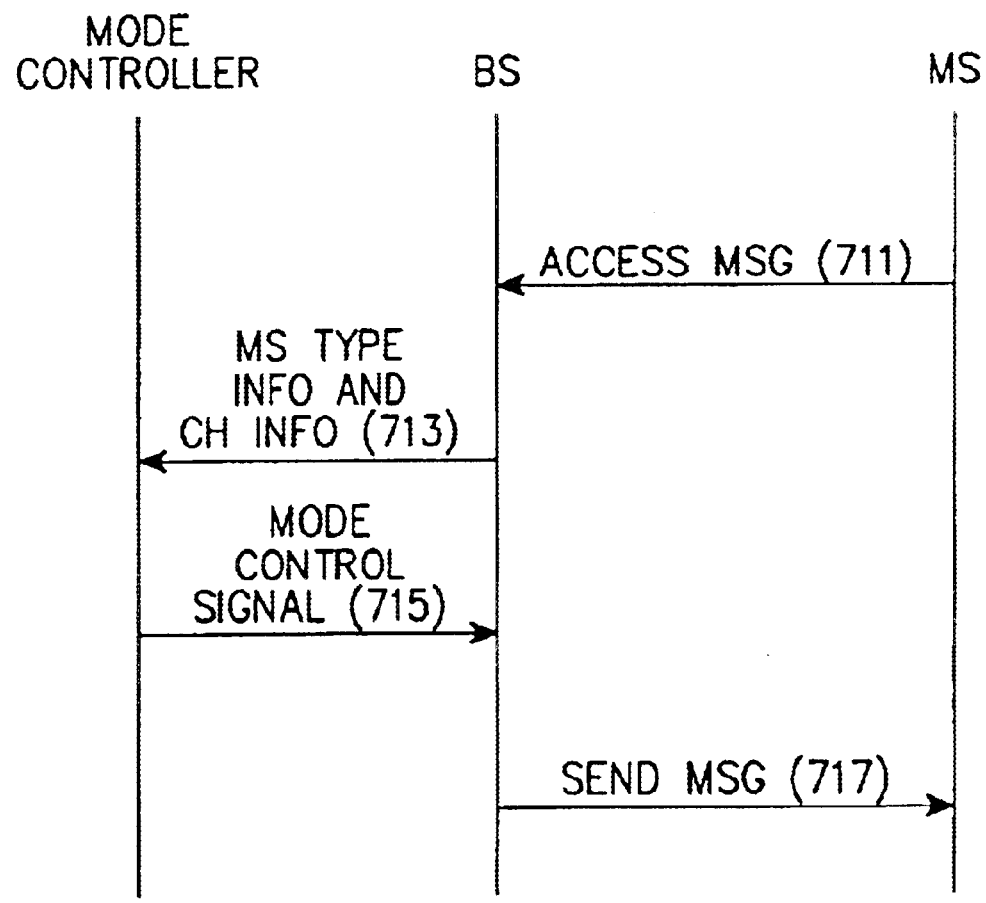
FIG. 7 is a flow diagram illustrating a channel spreading procedure in a CDMA communication system of FIG. 6 according to an embodiment of the present invention.

FIG. 7 shows a procedure, performed by the mode controller 600, for setting an orthogonal spreading mode of the respective channels by analyzing an access message received from the mode controller 600. Here, some channels should include orthogonal spreaders for performing BPSK and QPSK orthogonal modulation modes of operation.

Referring to FIG. 7, first, a mobile station (MS) sends a message including information for distinguishing the mobile station type (IS-95 mobile station or IMT-2000 mobile station) to a base station (BS) over an access channel, in step 711. Upon receipt of the information about the mobile station type, the base station recognizes the mobile station type by analyzing the received access channel message and sends the mode controller 600 the received information together with information about the channel over which the base station will send a message to the mobile station, in step 713. The mode controller 600 then outputs mode control signals for designating an orthogonal spreading mode of the respective channels shown in FIG. 6 according to the mobile station type, in step 715. Then, the respective channels set their orthogonal spreading modes according to the mode control signals from the mode controller 600. That is, the respective channels select either BPSK or QPSK modulation for orthogonal spreading according to the mode control signals, to orthogonally spread signals to be transmitted. When the orthogonal spreading mode is determined, the respective channels of the base station orthogonally spread the transmission signals by BPSK or QPSK modulation according to the mobile station type and transmit the spread transmission signals, in step 717.

In the channel structure of FIG. 6, since the common channels such as the pilot channel and the sync channel constantly transmit corresponding channel signals to every mobile station prior to receiving the access channel message from the mobile station, they can be fixed in the BPSK orthogonal spreading mode. Therefore, in order to demodulate some common channel signals such as the pilot channel signal and the sync channel signal, every IMT-2000 mobile station can also be fixed in the channel spreading mode of BPSK modulation. Further, in the IMT-2000 mobile stations, the channels not requiring backward compatibility with the IS-95 terminal can be fixed in the channel spreading mode of QPSK modulation. In addition, the IMT-2000 system can use the channel spreading mode of BPSK modulation for the channels currently used in the IS-95 system, and selectively use the channel spreading mode of BPSK or QPSK modulation for the channels (e.g., the fundamental traffic channel) used in both the IMT-2000 system and the IS-95 system.

The respective channel transmitters of FIG. 6 should have both the BPSK channel spreading scheme and the QPSK channel spreading scheme. However, when the specific common channels such as the pilot channel and the sync channel are fixedly set to the BPSK channel spreading mode in every base station, the mobile station may have only the BPSK channel spreading scheme regardless of the IS-95 system or the IMT-2000 system. However, the channels not requiring backward compatibility with the IS-95 mobile station, such as the dedicated control channel and the supplemental channel (which are newly proposed for the IMT-2000 system), are fixedly set to the QPSK channel spreading mode in the base station, and the corresponding IMT-2000 mobile station can have only the QPSK channel spreading scheme.

Figure 2:
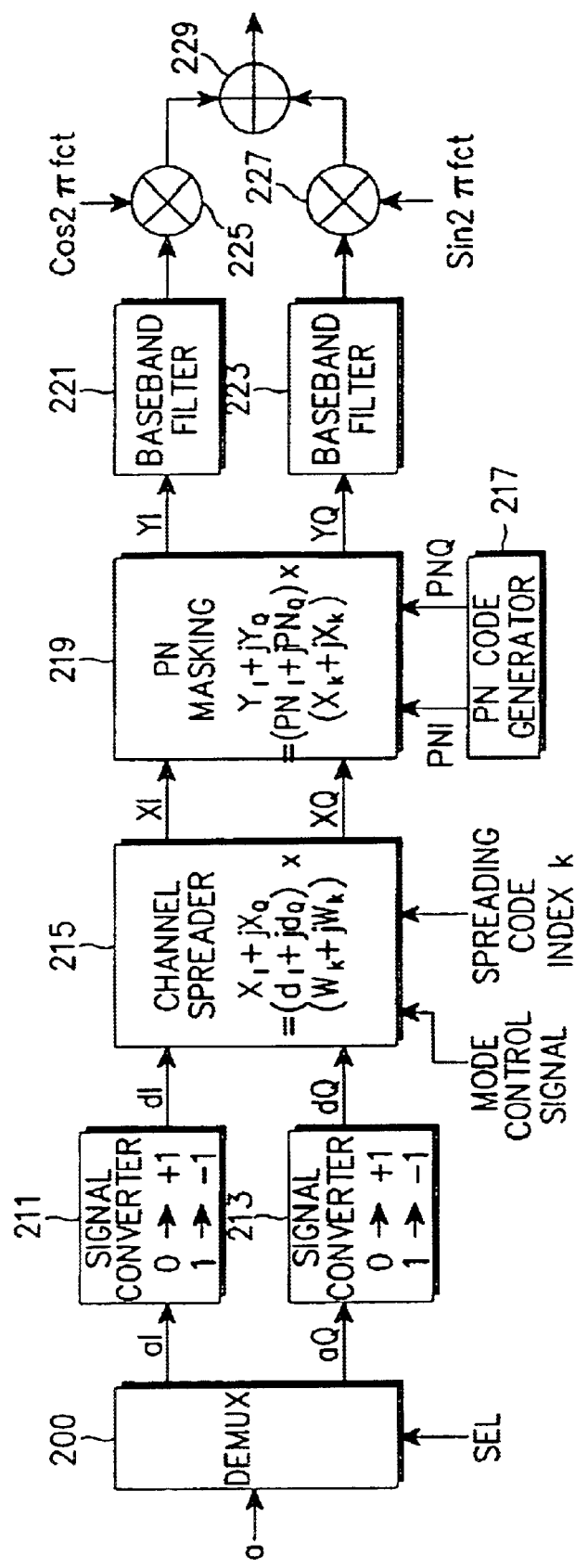
FIG. 2 is a block diagram illustrating a forward link transmitter for performing QPSK orthogonal code, spreading and QPSK PN code spreading in a CDMA communication system according to an embodiment of the present invention.
Figure 3:
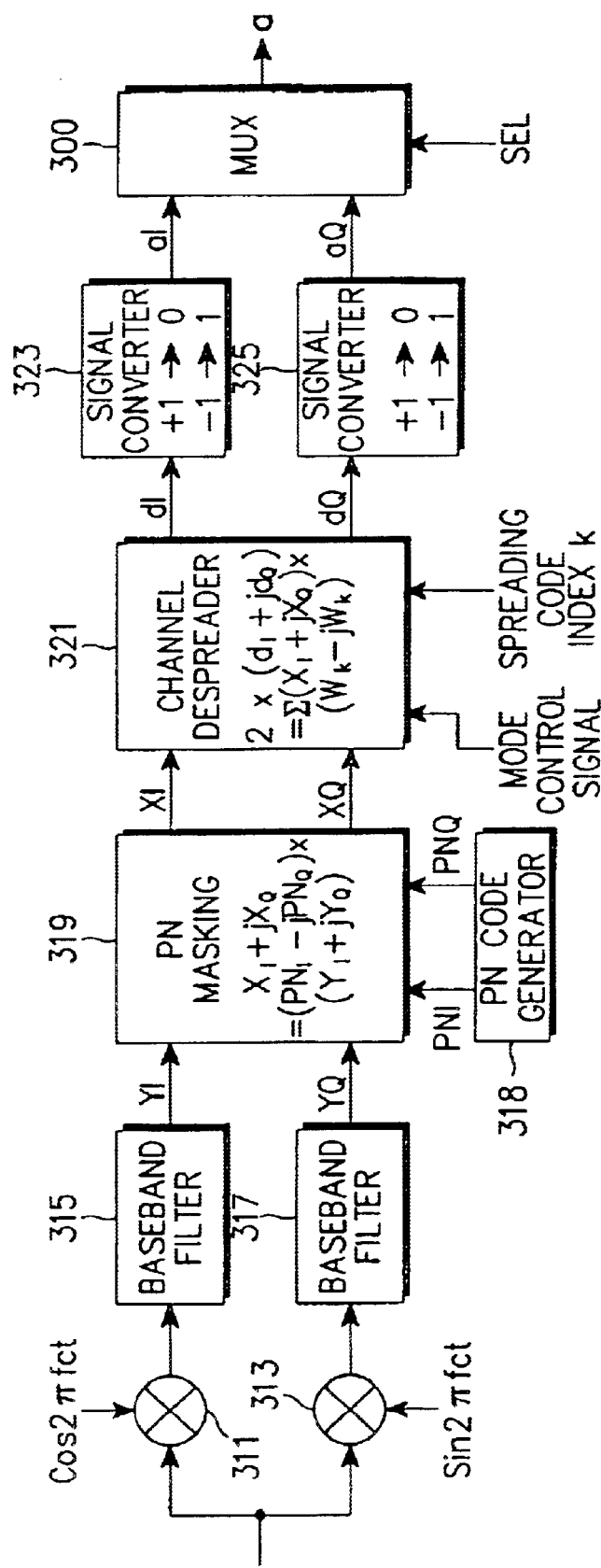
FIG. 3 is a block diagram illustrating a forward link receiver for demodulating a signal spread by the transmitter of FIG. 2, in a CDMA communication system according to an embodiment of the present invention.
Figure 4:
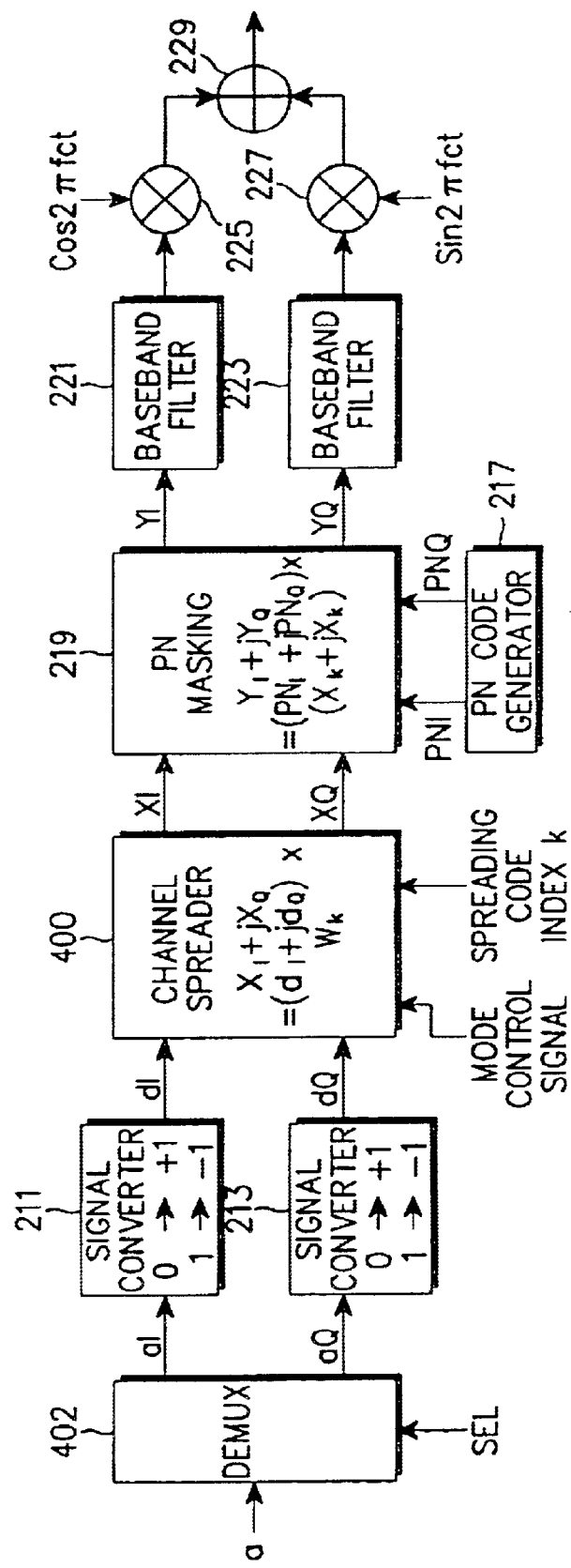
FIG. 4 is a block diagram illustrating a forward link transmitter for performing BPSK orthogonal code spreading and BPSK PN code spreading in a CDMA communication system according to an embodiment of the present invention.
Figure 5:
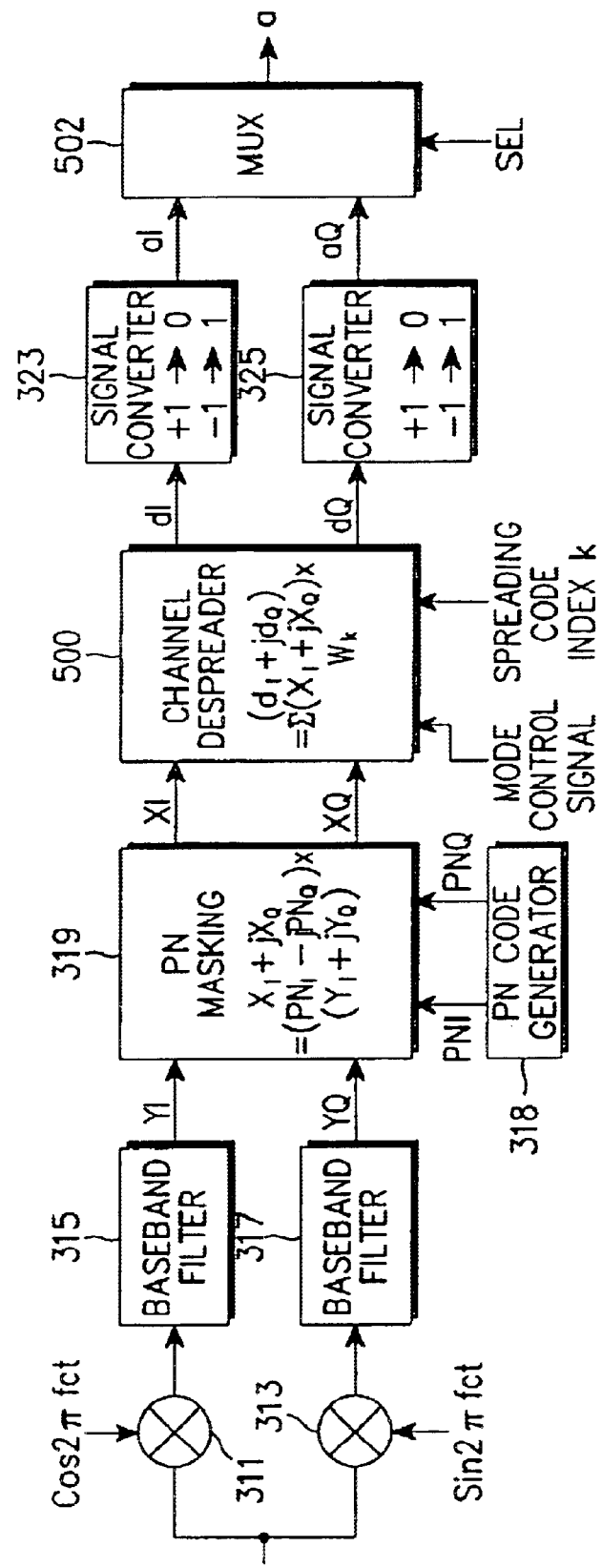
FIG. 5 is a block diagram illustrating a forward link receiver for demodulating a signal spread by the transmitter of FIG. 4, in a CDMA communication system according to an embodiment of the present invention.

FIGS. 2 to 5 show channel transmitters and channel receivers according to an embodiment of the present invention. More specifically, FIGS. 2 and 4 show channel transmitters of a forward link according to an embodiment of the present invention. Here, FIG. 2 shows a channel transmitter wherein a channel spreader 215 has a channel spreading scheme of QPSK modulation, and FIG. 4 shows a channel transmitter wherein a channel spreader 400 has a channel spreading scheme of BPSK modulation. Further, FIGS. 3 and 5 show channel receivers of the forward link according to an embodiment of the present invention. Here, FIG. 3 shows a channel receiver wherein a channel despreader 321 has a channel despreading scheme of QPSK demodulation, and FIG. 5 shows a channel receiver wherein a channel despreader 500 has a channel despreading scheme of BPSK demodulation.

Referring to FIG. 2, an input signal 'a' is applied to a demultiplexer 200 after channel coding, rate matching and interleaving. Further, a select signal SEL output from the mode controller 600 is applied to the demultiplexer 200 so as to demultiplex (or separate) the input signal 'a' into odd symbols aI and even symbols aQ, which are applied to a signal converter 211 and a signal converter 213, respectively. Therefore, the demultiplexer 200 demultiplexes the input signal 'a' into the odd signal aI and the even signal aQ according to the select signal SEL.

The signal converter 211 converts a signal '0' to '+1' and a signal '1' to '−1' for the input signal aI, to output a signal dI. The signal converter 213 converts a signal '0' to '+1' and a signal '1' to '−1' for the input signal aQ, to output a signal dQ. A channel spreader 215 determines its modulation method according to a mode control signal output from the mode controller 600. Further, the channel spreader 215 includes generators for generating real-component and imaginary-component spread signals according to a received spreading code index k. The channel spreader 215 receiving the signals dI and dQ output from the signal converters 211 and 213 and the spreading code index k, multiplies (for complex spreading) the spreading codes corresponding to the spreading code index k by the signals dI and dQ, to generate channel spread signals XI and XQ. In FIG. 2, it is assumed that the mode control signal applied to the channel spreader 215 designates a QPSK modulation mode. In this case, in the channel spreader 215, the spreading code generated according to the spreading code index k is both the real-component spreading code and the imaginary-component spreading code corresponding to the spreading code index k. Further, when the spreading codes are Walsh orthogonal codes, the channel spreader 215 outputs the channel spread signals of XI+jXQ=(dI+jdQ)*(Wk+jWk).

A PN code generator 217 generates PN codes PNI and PNQ for spreading the orthogonally spread signals XI and XQ. Here, the PN codes can be short PN sequences. A PN masking part 219 multiplies (for complex spreading) the orthogonally spread signals XI and XQ by the PN codes PNI and PNQ, to generate spread signals YI and YQ of YI+YQ=

(PNI+jPNQ)*(XI+jXQ). A baseband filter 221 filters the spread signal YI into a baseband signal, and a baseband filter 223 filters the spread signal YQ into a baseband signal. A mixer 225 multiplies an output of the baseband filter 221 by a carrier cos $2\pi fct$ to convert the output signal into a RF (Radio Frequency) signal. A mixer 227 multiplies an output of the baseband filter 223 by a carrier sin $2\pi fct$ to convert the output signal into a RF signal. An adder (or exclusive OR operator) 229 adds outputs of the mixers 225 and 227 to output a transmission signal.

As illustrated in FIG. 2, the input signals aI and aQ, each having the values of '0' and '1', are converted by the signal converters 211 and 213 into the signals dI and dQ, each having the values of '+1' and '−1'. The channel spreader 215 orthogonally spreads the signals dI and dQ according to the spreading code index k. At this point, the 2 symbol signals dI and dQ input to the channel spreader 215 can be expressed as a complex value of dI+jdQ, and this complex value is multiplied by a complex Walsh orthogonal code Wk+jWk to output the spread signals XI+jXQ=(dI+jdQ)*(Wk+jWk) for as many chips as the number N of chips in the orthogonal code.

Therefore, in FIG. 2, the channel transmitter orthogonally spreads the input signal 'a' by QPSK modulation and the demultiplexer 200 demultiplexes the input signal 'a' into the signals aI and aQ.

FIG. 3 shows a forward channel receiver for channel despreading the spread signal received from the forward link channel transmitter of FIG. 2 by QPSK demodulation.

Referring to FIG. 3, a mixer 311 mixes a received signal with a carrier cos $2\pi fct$, and a mixer 313 mixes the received signal with a carrier sin $2\pi fct$. A baseband filter 315 filters a signal output from the mixer 311 into a baseband signal, and a baseband filter 317 filters a signal output from the mixer 313 into another baseband signal.

A PN code generator 318 generates PN codes PNI and PNQ for despreading the received spread signals. A PN masking part 319 multiplies the signals YI and YQ output from the baseband filters 315 and 317 by the PN codes PNI and PNQ, to generate despread signals XI and XQ of XI+XQ=(PNI−jPNQ)*(YI+YQ).

A channel despreader 321 determines its demodulation mode (BPSK or QPSK modulation) for orthogonal despreading according to a control signal output from a controller of the mobile station (not shown in FIG. 3), and receives the despread signals XI and XQ and their associated Walsh code index k. The channel despreader 321 generates the real-component spreading code and the imaginary-component spreading code corresponding to the spreading code index k. Further, the channel despreader. 321 multiplies the input signals XI and XQ by the real-component spreading code and the imaginary-component spreading code, respectively, according to the designated demodulation mode, to generate channel despread signals dI and dQ. In this case, the orthogonal despreading results can be expressed as 2*(dI+jdQ)=Σ(XI+jXQ)*(Wk−jWk).

A signal converter 323 converts a signal '+1' to '0' and a signal '−1' to '1' for the signal dI output from the channel despreader 321. A signal converter 325 converts a signal '+1' to '0' and a signal '−1' to '1' for the signal dQ output from the channel despreader 321. The signals aI and aQ output from the signal converters 323 and 325 are applied to a multiplexer 300, which multiplexes the demodulated signals aI and aQ output from the signal converters 323 and 235 according to a control signal SEL from the controller. That is, in the QPSK mode of operation, the multiplexer 300 multiplexes the signals aI and aQ. The output signal 'a' of the multiplexer 300 is applied to a combiner in the following stage, and used for channel estimation.

In FIG. 3, the PN masking part 319 and the channel despreader 321 constitute one finger. For channel estimation, the mobile station includes a plurality of such fingers each comprised of the PN masking part 319 and the channel despreader 321.

With regard to the despreading procedure of the mobile station, the signals XI and XQ output from the PN masking part 319 are input to the channel despreader 321 together with the spreading code index k. At this point, the spreading code index k is known to both the base station and the mobile station through previous communication. Herein, the spreading code is assumed to be a Walsh orthogonal code. The signals XI and XQ input to the channel despreader 321 can be expressed as complex values of XI+jXQ, and those values are multiplied by a complex conjugate value Wk−jWk of the complex Walsh orthogonal code Wk+jWk. By accumulating the calculated values while repeating such an operation N times, the input value of the modulation process in FIG. 2 increases two times. Therefore, the channel despreader 321 outputs accumulated values. When N=1 in the demodulation procedure, the relationship between the input value and the output value can be expressed as Equation (1) above.

FIG. 4 shows a channel transmitter having a scheme for performing channel spreading by BPSK modulation in a CDMA communication system. The base station channel transmitter of FIG. 4 has the same structure as the channel transmitter of FIG. 2 except for the structure of a channel spreader 400. That is, the channel spreader 400 performs channel spreading by BPSK modulation. In this case, the mode controller 600 generates control signals for operating a demultiplexer 402 and the channel spreader 400 in the BPSK channel spreading mode.

Referring to FIG. 4, an input signal 'a' is applied to the demultiplexer 402 after channel coding, rate matching and interleaving. When the mode controller 600 generates a select signal SEL for selecting the BPSK mode, the signal 'a' is not applied to the signal converter 213, but only to the signal converter 211. The signal aI having the values of '0' and '1', output from the demultiplexer 402, is converted to the values '+1' and '−1' in the signal converter 211. At this point, since there is no signal applied to the signal converter 213, the signal dQ has a specific logic value of '0'. The channel spreader 400 is set to the BPSK modulation mode according to the mode control signal, and receives the signals dI and dQ together with the orthogonal code index k for orthogonal spreading. Then, the channel spreader 400 generates a spreading code corresponding to u the input channel spreading code index, wherein the generated spreading code can be a real-component Walsh orthogonal code Wk. Thereafter, the channel spreader 400 mixes the generated spreading code with the input signals dI and dQ to generate channel spread signals. At this point, the signals dI and dQ input to the channel spreader 400 can be expressed as complex values of dI+jdQ, and those values are multiplied by the Walsh orthogonal code Wk to generate the spread signals of XI+jXQ=(dI+jdQ)*Wk.

FIG. 5 shows a mobile station receiver for demodulating a spread signal received from the base station transmitter of FIG. 4 having the BPSK channel spreader. The mobile station receiver of FIG. 5 also has the same structure as the channel receiver of FIG. 3 except for the channel despreader 500. That is, the channel despreader 500 performs channel despreading by BPSK demodulation. Herein, it is assumed that the mode control signal applied to the channel despreader 500 designates the BPSK demodulation mode. A multiplexer 502 blocks the signal aQ output from the signal converter 325 in the BPSK demodulation mode according to the select signal SEL.

Referring to FIG. 5, the signals XI and XQ output from the PN masking part 319 are input to the channel despreader 500 together with the spreading code index k. At this point, the spreading code index k is known to both the base station and the mobile station through previous communication. The channel despreader 500 is set to the BPSK demodulation mode according to the control signal output from a controller of the mobile station (not shown in FIG. 5), and generates a spreading code corresponding to the spreading code index. At this point, the channel despreader 500 generates a real-component Walsh orthogonal code Wk for the spreading code. Thereafter, the channel despreader 500 mixes the generated Walsh orthogonal code Wk with the input signals XI and XQ to generate channel despread signals dI and dQ. The signals XI and XQ can be expressed as complex values of XI+jXQ, and those values are multiplied by the Walsh orthogonal code Wk in the channel despreader 500.

By accumulating the calculated values while repeating such an operation N times, the input values of the modulation process in FIG. 4 are output. Therefore, the channel despreader 500 outputs the accumulated values. When N=1 in the demodulation procedure, the relationship between the input value and the output value can be expressed as Equation (2) above.

As described above, in the CDMA communication system performing channel spreading and despreading by using the Walsh orthogonal code, the IS-95 system uses BPSK orthogonal spreading, whereas the IMT-2000 system uses QPSK orthogonal spreading. Communication cannot be performed between a base station of the IMT-2000 system and a mobile station of the IS-95 system or between a base station of the IS-95 system and a mobile station of the IMT-2000 system.

When the channel transmitters and channel receivers for the forward link are constructed as described above, the IMT-2000 base station operates, upon detecting the IS-95 mobile station, the common channels such as the pilot channel, the sync channel and the paging channel in the BPSK channel spreading mode. The base station having the BPSK channel transmitter of FIG. 4 channel spreads the signals on the common channels by BPSK modulation before transmission. Upon initial setup (or power-on), the mobile station sends its channel spreading mode information to the base station. When the mobile station transmits to the base station an access channel message including information indicating that it is an IS-95 mobile station, the base station recognizes that the counterpart mobile station is an IS-95 mobile station by analyzing the received access channel message, and then transmits a channel assignment message for BPSK modulation over the paging channel. Thereafter, the base station and the mobile station communicate with each other by performing channel spreading and despreading in the BPSK mode. Instead of using the method in which the mobile station sends its channel spreading mode information during the initial setup, it is also possible to use a method in which the mobile station sends its channel spreading mode information to the base station over the access channel during a call setup between the base station and the mobile station, or the base station sends a channel spreading mode inquiry message to the mobile station over the paging channel.

Alternatively, upon detecting the IMT-2000 mobile station, the IS-95 base station operates in the BPSK channel spreading mode to receive the common channels such as the pilot channel, the sync channel and the paging channel. In the BPSK channel receiver of FIG. 5, the multiplexer 502 selectively outputs only the despread signal aI output from the signal converter 323 excluding the despread signal aQ, and the output signal of the multiplexer 502 undergoes decoding in the following stage, thereby providing backward compatibility with the IS-95 base station. Therefore, the IS-95 base station can receive a signal. transmitted from the IMT-2000 mobile station. Thereafter, when the IMT-2000 mobile station transmits an access channel message to the IS-95 base station to attempt a call, the IS-95 base station sends a channel assignment message including the base station type information indicating that it is an IS-95 base station upon receipt of the access channel message. The IMT-2000 mobile station then recognizes that the counterpart base station is an IS-95 base station, and sets the channel spreading mode to BPSK mode. Thereafter, the IS-95 base station and the IMT-2000 mobile station communicate with each other by performing channel spreading and despreading in the BPSK mode.

Figure 8:
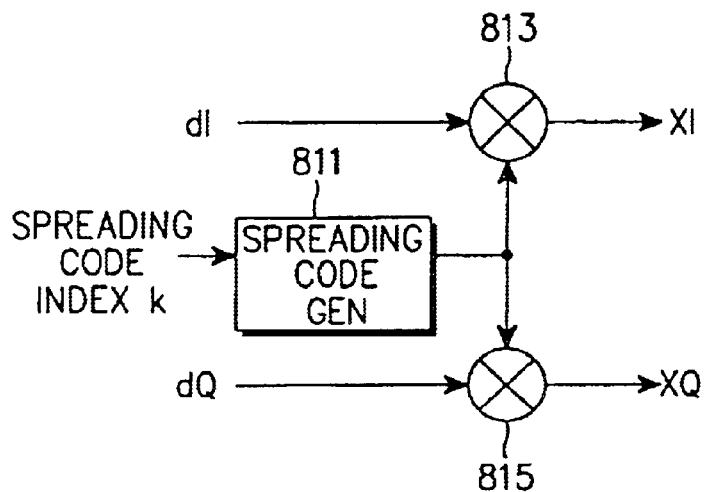
FIG. 8 is a diagram illustrating an orthogonal code spreading device with a BPSK mode in a CDMA communication system having the structure of FIG. 4 according to a first embodiment of the present invention.
Figure 9:
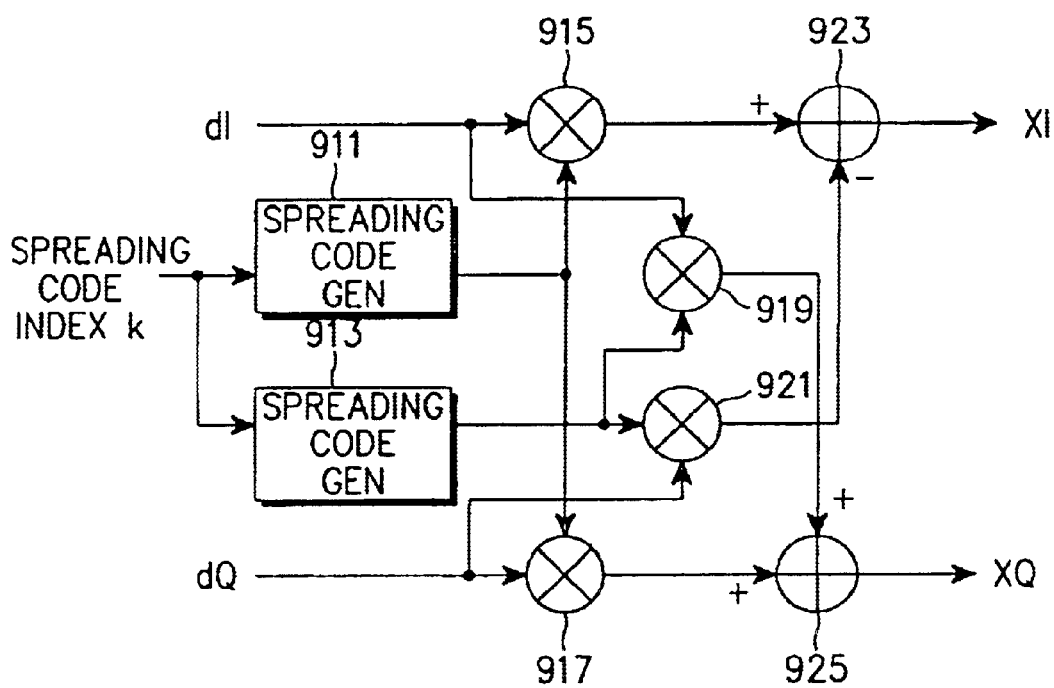
FIG. 9 is a diagram illustrating an orthogonal code spreading device with a QPSK mode in a CDMA communication system having the structure of FIG. 5 according to a first embodiment of the present invention.

Therefore, the IMT-2000 base station and the IMT-2000 mobile station should be able to communicate with the IS-95 mobile station and the IS-95 base station, respectively. To this end, the IMT-2000 base station and the IMT-2000 mobile station should be able to perform channel spreading and despreading in both BPSK and QPSK modes. FIGS. 8 and 9 show channel spreaders using BPSK modulation and QPSK modulation, respectively. There are two channel spreading methods: one is to provide two or more spreaders, as shown in FIGS. 8 and 9, and select a channel spreader corresponding to a designated mode, and another is to provide a channel spreader shown in FIG. 9 and selectively control the BPSK and QPSK modes by controlling an imaginary-component spreading code. In an embodiment of the present invention, the channel spreading is performed in the latter method.

FIG. 8 shows the channel spreader 400 in the BPSK channel transmitter of FIG. 4.

Referring to FIG. 8, a spreading code generator 811 having a spreading code table, generates a spreading code corresponding to an input spreading code index k. A multiplier 813 multiplies the input signal dI by the generated spreading code to generate a channel spread I-channel signal XI. A multiplier 815 multiplies the input signal dQ by the generated spreading code to generate a channel spread Q-channel signal XQ. Here, the spreading code can be a Walsh code.

With regard to operation of the channel spreader 400 using BPSK modulation, the input signals dI and dQ are input to the multipliers 813 and 815, respectively. At the same time, the spreading code index k for designating a specific spreading code is input to the spreading code generator 811. Then, the spreading code generator 811 generates a spreading code corresponding to the spreading code index k and provides the generated spreading code to the multipliers 813 and 815. The multiplier 813 then multiplies the input signal dI by the spreading code to generate an output signal XI, and the multiplier 815 multiplies the input signal dQ by the spreading code to generate an output signal XQ.

FIG. 9 shows the channel spreader 215 in the QPSK channel transmitter of FIG. 2.

Referring to FIG. 9, first and second spreading code generators 911 and 913 each receive the spreading code index k, and generate a first spreading code of the real component and a second spreading code of the imaginary component each corresponding to the spreading code index k. Here, the first and second spreading codes output from the first and second spreading code generators 911 and 913 are the I-component spreading code and the Q-component spreading code, respectively. A multiplier 915 multiplies the input signal dI by the first spreading code generated from the first spreading code generator 911, and a multiplier 917 multiplies the input signal dQ by the first spreading code generated from the first spreading code generator 911. It can be understood that the structure comprised of the first spreading code generator 911 and the multipliers 915 and 917 is identical to the BPSK channel spreader of FIG. 8. A multiplier 919 multiplies the input signal dI by the second spreading code output from the second spreading code generator 913, and a multiplier 921 multiplies the input signal dQ by the second spreading code output from the second spreading code generator 913. An adder 923 subtracts an output of the multiplier 921 from an output of the multiplier 915 to generate an output signal XI. An adder 925 adds an output of the multiplier 919 to an output of the multiplier 917 to generate an output signal XQ.

With regard to operation of the QPSK channel spreader of FIG. 9, the input signal dI is applied to the multipliers 915 and 919, and the input signal dQ is applied to the multipliers 917 and 921. At the same time, the first and second spreading code generators 911 and 913 generate an I-component spreading code and a Q-component spreading code, respectively, corresponding to the received spreading code index k. The I-component spreading code is input to the multipliers 915 and 917. The multiplier 915 then multiplies the I-component input signal dI by the I-component spreading code and provides its output to the adder 923. Further, the multiplier 917 multiplies the Q-component input signal dQ by the I-component spreading code and provides its output to the adder 925. At this point, the Q-component spreading code is input to the multipliers 919 and 921. The multiplier 919 multiplies the I-component input signal dI by the Q-component spreading code and provides its output to the adder 925. The adder 925 then adds a signal output from the multiplier 917 to a signal output from the multiplier 919 to generate an output signal XQ. At the same time, the multiplier 921 multiplies the Q-component input signal dQ by the Q-component spreading code and provides its output to the adder 923. The adder 923 then subtracts an output signal of the multiplier 921 from an output signal of the multiplier 915 to generate an output signal XI.

Figure 10:
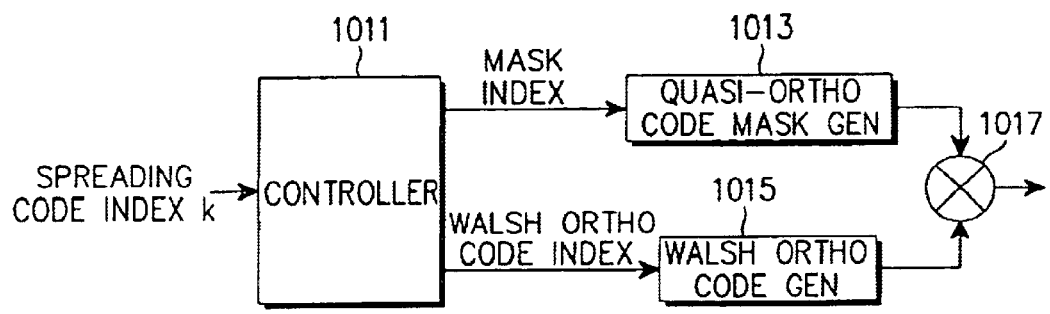
FIG. 10 is a diagram illustrating the structure of a spreading code generator according to a first embodiment of the present invention.

FIG. 10 shows the spreading code generator in the channel spreaders of FIGS. 8 and 9. Here, the spreading code can be Walsh orthogonal code or a quasi-orthogonal code. The quasi-orthogonal code is generated by mixing the Walsh orthogonal code with a quasi-orthogonal code mask. A device and method for generating quasi-orthogonal code is disclosed in detail in Korean patent application No. 97-47457, filed by the applicant. However, the prior art device is designed for BPSK modulation, and the correlation of the sequences is $2^{m+1}$ ($>\sqrt{L}$) for length $L=2^{2m+1}$. In addition, a complex quasi-orthogonal sequence for QPSK modulation is disclosed in Korean patent application No. 98-37453 (corresponding to International Application No.: PCT/KR99/00532 filed on Sep. 8, 1999), filed by the applicant.

Referring to FIG. 10, a controller 1011 calculates a quasi-orthogonal code mask index and a Walsh orthogonal code index for generating quasi-orthogonal code corresponding to the received spreading code index k. A quasi-orthogonal code mask generator 1013 having a quasi-orthogonal code mask table, selects a quasi-orthogonal code mask corresponding to the quasi-orthogonal code mask index from the table. A Walsh orthogonal code generator 1015 having a Walsh orthogonal code table, selects a Walsh orthogonal code corresponding to the Walsh orthogonal code index from the table. A multiplier 1017 multiplies the quasi-orthogonal code mask by the Walsh orthogonal code to generate a spreading code. When a quasi-orthogonal code mask index is not selected, the quasi-orthogonal code mask generator 1013 does not generate a quasi-orthogonal code mask, so the multiplier 1017 outputs the Walsh orthogonal code output from the Walsh orthogonal code generator 1015 as the spreading code. When the quasi-orthogonal code mask generator 1013 outputs a quasi-orthogonal code mask, the spreading code output from the multiplier 1017 becomes a quasi-orthogonal code.

In FIG. 9, the spreading code generator includes the first spreading code generator 911 for generating the I-component (or real-component) spreading code and the second spreading code generator 913 for generating the Q-component (or imaginary-component) spreading code. The first and second spreading code generators each have the structure shown in FIG. 10. When using the complex quasi-orthogonal sequence, the first and second spreading code generators 911 and 913 can use the same spreading code index k. In this case, the controller 1011 for the spreading code generators 911 and 913 generates a quasi-orthogonal code mask index and a Walsh orthogonal code index according to the received spreading code index k, and the generated quasi-orthogonal code mask index and Walsh orthogonal code index are identical to each other. Although a real-component Walsh orthogonal code or a imaginary-component Walsh orthogonal code generated from the Walsh orthogonal code generator 1015 is the same Walsh orthogonal code, the real-component quasi-orthogonal code mask or the imaginary-component quasi-orthogonal code mask generated from the quasi-orthogonal code mask generator 1013 can be different quasi-orthogonal code masks. When the real-component quasi-orthogonal code mask values and the imaginary-component quasi-orthogonal code mask values stored in an internal memory of the quasi-orthogonal code mask generator 1013 are different, the I-component mask output and the Q-component mask output become different even though the same mask index is received. It is also possible to implement the memory having the mask values with the hardware for generating a mask value according to an index.

In an embodiment of the present invention, the spreading code generators 911 and 913 receive the same spreading code index k. However, it is also possible to use different indexes for generating the real-component spreading code and the imaginary-component spreading code.

Further, although an embodiment separately includes the real-component spreading code generator 911 and the imaginary-component spreading code generator 913 as shown in FIG. 9, it is also possible to use a single spreading code generator. That is, the quasi-orthogonal code mask generator 1013 includes separate tables for storing the real-component and imaginary-component quasi-orthogonal code masks, and the Walsh orthogonal code generator 1015 includes a phase shifter, disposed at an output stage thereof, for generating the imaginary-component Walsh orthogonal code. Further, by simultaneously inputting the spreading code index k to the two tables in the quasi-orthogonal code mask generator 1013, it is possible to simultaneously generate the real-component and imaginary-component quasi-orthogonal code masks, and to simultaneously generate the real-component Walsh orthogonal code and the phase-shifted imaginary-component Walsh orthogonal code output from the Walsh orthogonal code generator 1015. Further, the multiplier 1017 is constructed with a first multiplier and a second multiplier, wherein the first multiplier multiplies the real-component quasi-orthogonal code mask by the Walsh orthogonal code and the second multiplier multiplies the imaginary-component quasi-orthogonal code mask by the Walsh orthogonal code.

A description will be made regarding operation of the spreading code generator 911 (or 913), with reference to FIG. 10. Upon receipt of the spreading code index k, the controller 1011 calculates a quasi-orthogonal code mask index and a Walsh orthogonal code index corresponding to the received spreading code index k. The quasi-orthogonal code mask index is input to the quasi-orthogonal code mask generator 1013, and the Walsh orthogonal code index is input to the Walsh orthogonal code generator 1015. The quasi-orthogonal code mask generator 1013 generates a quasi-orthogonal code mask expressed with '+1' and '−1', and provides the generated quasi-orthogonal code mask to the multiplier 1017. The Walsh orthogonal code generator 1015 generates a Walsh orthogonal code expressed with '+1' and '−1', and provides the generated Walsh orthogonal code to the multiplier 1017. The multiplier 1017 then multiplies the quasi-orthogonal code mask by the Walsh orthogonal code to generate a spreading code. Here, the spreading code can be a Walsh orthogonal code or a quasi-orthogonal code.

In the spreading code generator of FIG. 10, the mask value output from the quasi-orthogonal code mask generator 1013 and the Walsh orthogonal code output from the Walsh orthogonal code generator 1015 have the values of '+1' and '−1'. However, when the mask value output from the quasi-orthogonal code mask generator 1013 and the Walsh orthogonal code output from the Walsh orthogonal code generator 1015 have the values of '0' and '1' in the spreading code generator 911 (or 913), it is possible to use an adder (or exclusive OR operator) in place of the multiplier 1017 to add the two output values, and then convert the added values to the values of '+1' and '−1'.

FIG. 15 shows a quasi-orthogonal code mask table and a Walsh orthogonal code table according to the spreading code index k in the spreading code generator 911 (or 913) of FIG. 10.

A description will be made with regard to operation of the spreading code generator of FIG. 10 when it generates the Walsh orthogonal code. The quasi-orthogonal code mask index is set to a specific value '0', which is a system parameter and can be varied, and the quasi-orthogonal code mask generator 1013 receives this index and constantly outputs a signal of '1'. Therefore, the Walsh orthogonal code generator 1015 generates a Walsh orthogonal code corresponding to the Walsh orthogonal code index and outputs the generated Walsh orthogonal code as the spreading code. Next, a description will be made with regard to operation of the spreading code generator of FIG. 10 when it generates quasi-orthogonal code. Upon receipt of the spreading code index k, the controller 1011 generates a quasi-orthogonal code mask index and a Walsh orthogonal code index for generating a quasi-orthogonal code corresponding to the received spreading code index k. Then, the quasi-orthogonal code mask generator 1013 selects a quasi-orthogonal code mask corresponding to the quasi-orthogonal code mask index from the quasi-orthogonal code mask table of FIG. 15, and the Walsh orthogonal code generator 1015 selects a Walsh orthogonal code corresponding to the Walsh orthogonal code index from the Walsh orthogonal code table of FIG. 15. The quasi-orthogonal code mask is mixed with the Walsh orthogonal code by the multiplier 1017 to generate the quasi-orthogonal code.

In the channel structure of FIG. 6, the respective channels should be able to support both of the two spreading schemes (i.e., BPSK and QPSK modulation modes), and the two hardware structures can be implemented in this method. As an alternative method, a single hardware structure is provided of which spreading scheme is variable according to a mode control command. In a second embodiment below, a channel spreader performs orthogonal spreading in the two (BPSK and QPSK) modulation modes.

B. Second Embodiment

FIGS. 11 to 14 show the channel spreader 215 or 400 in the channel transmitters of FIGS. 2 and 4, which performs BPSK or QPSK channel spreading by disconnecting or connecting a Q-component spreading code according to a mode control signal.

Figure 11:
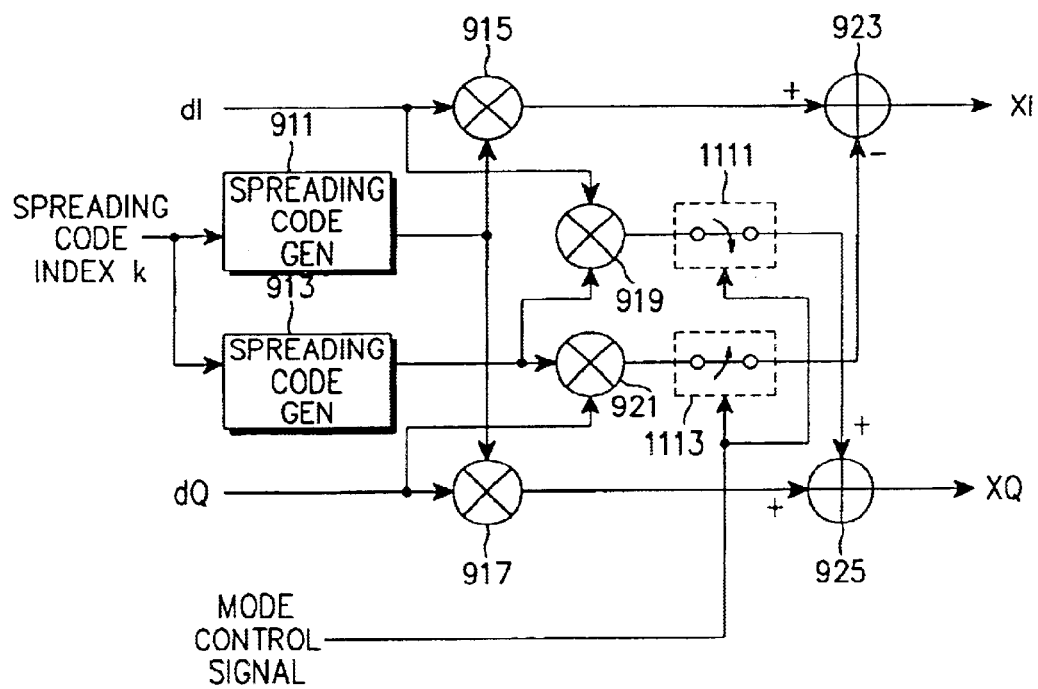
FIGS. 11 to 14 are diagrams illustrating orthogonal code spreading devices for performing orthogonal spreading in a BPSK or QPSK mode of operation according to a second embodiment of the present invention.

Referring to FIG. 11, the channel spreader has the same structure as the QPSK channel spreader of FIG. 9 except the scheme for selecting a BPSK path and a QPSK path according to the mode control signal from the mode controller 600. That is, the channel spreader of FIG. 11 further includes a switch 1111 interposed between the multiplier 919 and the adder 925, being switching according to the mode control signal, and a switch 1113 interposed between the multiplier 921 and the adder 923, being switched according to the mode control signal. The switches 1111 and 1113 are simultaneously switched by the mode control signal.

With regard to operation of the channel spreader of FIG. 11, when the channel spreader is set to the BPSK mode, the switches 1111 and 1113 are turned off so that the output signal of the multiplier 919 and the output signal of the multiplier 921 are not applied to the adders 925 and 923. Therefore, the adder 925 adds '0' to the output signal of the multiplier 917, and the adder 923 subtracts '0' from the output signal of the multiplier 915. Accordingly, the output signals XI and XQ are output in the same manner as in the BPSK channel spreader of FIG. 8.

Alternatively, when the channel spreader is set to the QPSK mode, the switches 1111 and 1113 connect the multipliers 919 and 921 to the adders 925 and 923, respectively so that the output signals of the multipliers 919 and 921 are applied to the adders 925 and 923, respectively. Therefore, the channel spreader serves as the QPSK channel spreader of FIG. 9.

Figure 12:
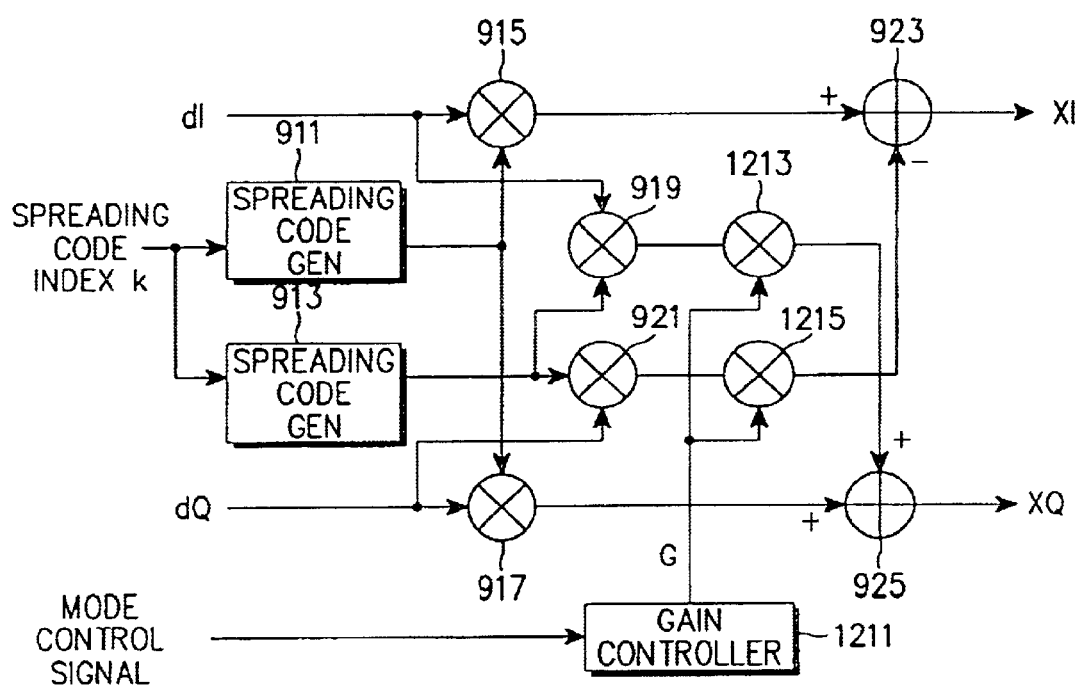

Referring to FIG. 12, the channel spreader has the same structure as the QPSK channel spreader of FIG. 9 except the scheme for selecting a BPSK path and a QPSK path according to the mode control signal from the mode controller 600. That is, in the channel spreader of FIG. 12, a gain controller 1211 generates a gain control signal having a first value for the BPSK mode and a second value for the QPSK mode according to the mode control signal output from the mode controller 600. A multiplier 1213 connected between the multiplier 919 and the adder 925, controls an output gain of the multiplier 919 according to the gain control signal. A multiplier 1215 connected between the multiplier 921 and the adder 923, controls an output gain of the multiplier 921 according to the gain control signal. The multipliers 1213 and 1215 are provided with the same gain control signal. When the gain control signal is '0', the Q-component signals output from the multipliers 919 and 921 are not applied to the adders 925 and 923. When the gain control signal is '1', the Q-component signals are applied to the adders 925 and 923.

With regard to operation of the channel spreader of FIG. 12, when the channel spreader is set to the BPSK mode, the mode control signal indicating the BPSK spreading mode is applied to the gain controller 1211. In this case, the gain controller 1211 outputs the gain control signal having a value '0' to the multipliers 1213 and 1215. Then, the multipliers 1213 and 1215 both generate the output signals of '0'. Therefore, the adder 925 adds '0' to the spread signal output from the multiplier 917 and the adder 923 subtracts '0' from the spread signal output from the multiplier 915. Accordingly, the output signals XI and XQ are output in the same manner as in the BPSK channel spreader of FIG. 8.

Alternatively, when the channel-spreader is set to the QPSK mode, the mode control signal indicating the QPSK spreading mode is applied to the gain controller 1211. In this case, the gain controller 1211 outputs the gain control signal having a value '1' to the multipliers 1213 and 1215. Then, the multipliers 1213 and 1215 multiplies the gain control signal '1' by the spread signals output from the multipliers 919 and 921, respectively, so that the output signals of the multipliers 1213 and 1215 become identical to the output signals of the multipliers 919 and 921. The output of the multiplier 1213 is applied to the adder 925 and the output of the multiplier 1215 is applied to the adder 923. Then, the adder 923 subtracts the output of the multiplier 1215 from the output of the multiplier 915, to generate the channel spread signal XI, and the adder 925 adds the output of the multiplier 1213 to the output of the multiplier 917, to generate the channel spread signal XQ. Accordingly, the channel spread signals XI and XQ are output in the same manner as in the QPSK channel spreader of FIG. 9.

Figure 13:
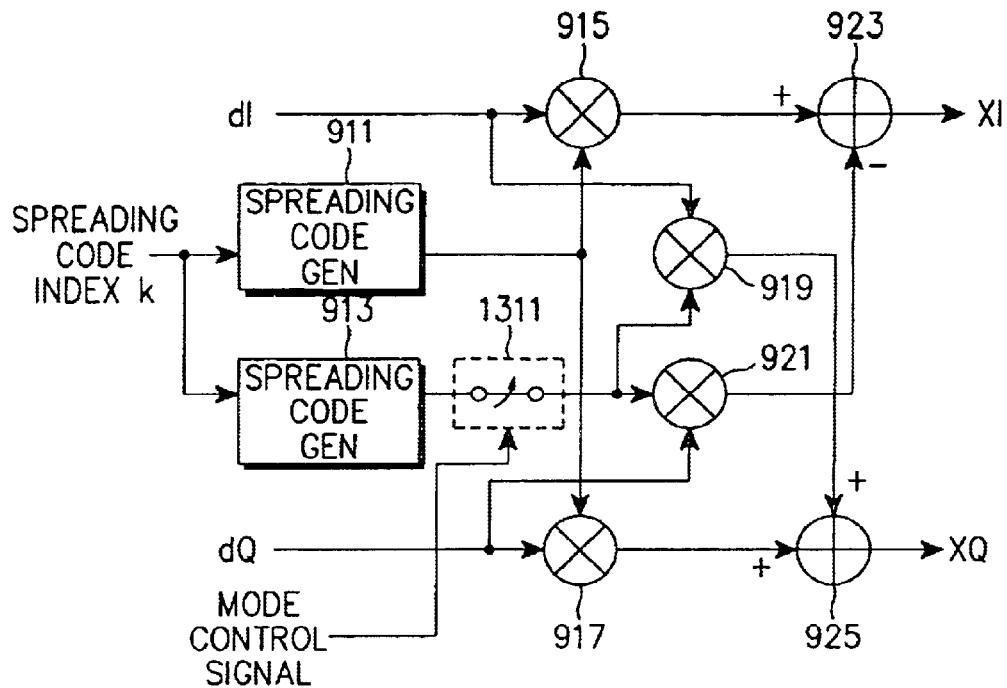

Referring to FIG. 13, the channel spreader has the same structure as the QPSK channel spreader of FIG. 9 except the scheme for selecting a BPSK path and a QPSK path according to the mode control signal from the mode controller 600. That is, the channel spreader of FIG. 13 further includes a switch 1311 connected between the second spreading code generator 913 and the multipliers 919 and 921, which is switched according to the mode control signal to control output of the Q-component spreading code.

With regard to operation of the channel spreader of FIG. 13, when the channel spreader is set to the BPSK mode, the switch 1311 is switched off, so that an output path of the second spreading code generator 913 is disconnected from the multipliers 919 and 921. Accordingly, the multiplier 919 multiplies the input signal dI by '0' and outputs a resulting value '0' to the adder 925. As a result, the adder 925 outputs a value identical to the output value of the multiplier 917. Similarly, the multiplier 921 multiplies the input signal dQ by '0' and outputs a resulting value '0' to the adder 923. As a result, the adder 923 outputs a value identical to the output value of the multiplier 915. Therefore, the final output values are identical to the output values in the BPSK channel spreader.

Alternatively, when the channel spreader is set to the QPSK mode, the switch 1311 is turned on, so that the Q-component spreading code generated from the second spreading code generator 913 is normally applied to the multipliers 919 and 921. Thereafter, in the same process as in FIG. 9, the channel spreader generates the QPSK channel spread signals.

Figure 14:
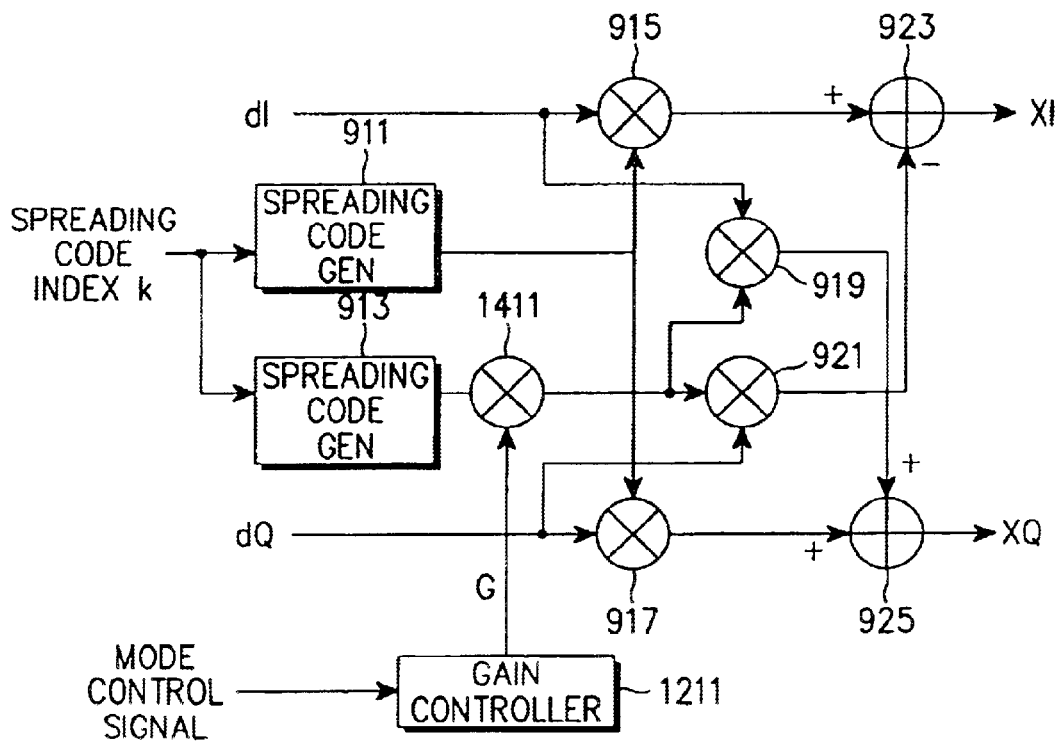

Referring to FIG. 14, the channel spreader has the same structure as the QPSK channel spreader of FIG. 9 except the scheme for selecting a BPSK path and a QPSK path according to the mode control signal from the mode controller 600. That is, the channel spreader of FIG. 13 further includes a gain controller 1211 for generating a gain control signal according to the mode control signal, and a multiplier 1411 connected between the second spreading code generator 913 and the multipliers 919 and 921, which controls output of the Q-component spreading code according to the mode control signal.

With regard to operation of the channel spreader of FIG. 14, when the channel spreader is set to the BPSK mode, the gain controller 1211 generates the gain control signal having a value '0' according to the mode control signal. The multiplier 1411 then multiplies the output of the second spreading code generator 913 by '0' so that an output path of the spreading code generator 913 is disconnected from the multipliers 919 and 921. Accordingly, the multiplier 919 multiplies the input signal dI by '0' and outputs a resulting value '0' to the adder 925. As a result, the adder 925 outputs a value identical to the output value of the multiplier 917. Similarly, the multiplier 921 multiplies the input signal dQ by '0' and outputs a resulting value '0' to the adder 923. As a result, the adder 923 outputs a value identical to the output value of the multiplier 915. Therefore, the final output values are identical to the output values in the BPSK channel spreader.

Alternatively, when the channel spreader is set to the QPSK mode, the gain controller 1211 generates the gain control signal having a value '1' according to the mode control signal. The multiplier 1411 then multiplies the output of the second spreading code generator 913 by '1', so that the Q-component spreading code generated from the second spreading code generator 913 is normally applied to the multipliers 919 and 921. Thereafter, in the same process as in FIG. 9, the channel spreader generates the QPSK channel spread signals.

FIGS. 11 to 14 show 4 types of the channel spreaders supporting both the BPSK and QPSK modulations by using the switch or controlling the signal gain to control output of the Q-component spreading code. Now, a description will be made regarding a different method in which the channel spreader has the same structure as that of FIG. 9 and selectively serves as the BPSK or QPSK channel spreader by using the spreading code generator. FIGS. 17 to 21 show different examples of the channel spreader which selectively serves as the BPSK or QPSK channel spreader by using the spreading code generator.

FIG. 16 shows I-component quasi-orthogonal code mask index, Q-component quasi-orthogonal code mask index, and Walsh orthogonal code index according to spreading code index. When the BPSK mode is designated, a value k between (N+1)*128 and (N+2)*127 is designated as the spreading code index for the channel spreader of FIG. 9 and applied to the I-component spreading code generator 911 and the Q-component spreading code generator 913. Here, a description will be made regarding operation of the Q-component channel spreader with reference to FIG. 10. The received spreading code index k is input to the controller 1011, which calculates a quasi-orthogonal code mask index and a Walsh orthogonal code index according to the spreading code index k and provides the mask index to the quasi-orthogonal code mask generator 1013 and the Walsh orthogonal code index to the Walsh orthogonal code generator 1015. At this point, for the quasi-orthogonal code mask index, the quasi-orthogonal code mask generator 1013 outputs the quasi-orthogonal code mask of all 0's to the multiplier 1017. Therefore, the Q-component second spreading code generator 913 outputs '0' and thus, the channel spreader of FIG. 9 serves as the BPSK channel spreader.

FIGS. 17 to 21 show BPSK and QPSK orthogonal spreading methods performed in a different manner from FIGS. 11 to 14. In FIGS. 17 to 21, the second spreading code generator 913 controls output of its spreading code by controlling output of the quasi-orthogonal code mask generator 1013 or the Walsh orthogonal code generator 1015. That is, in the channel spreader of FIG. 9, the first spreading code generator 911 has the structure shown in FIG. 10 and the second spreading code generator 913 has any one of the structures shown in FIGS. 17 to 21.

The spreading code generators of FIGS. 17 to 21 have the structure similar to that of FIG. 10, and control output of the second spreading code generator 913 according to the mode control signal output from the mode controller 600. That is, when the mode control signal indicates a QPSK mode control signal, the output signal of the second spreading code generator 913 is normally output. However, when the mode control signal indicates a BPSK mode control signal, the output signal of the second spreading code generator 913 is controlled (or suppressed).

Figure 17:
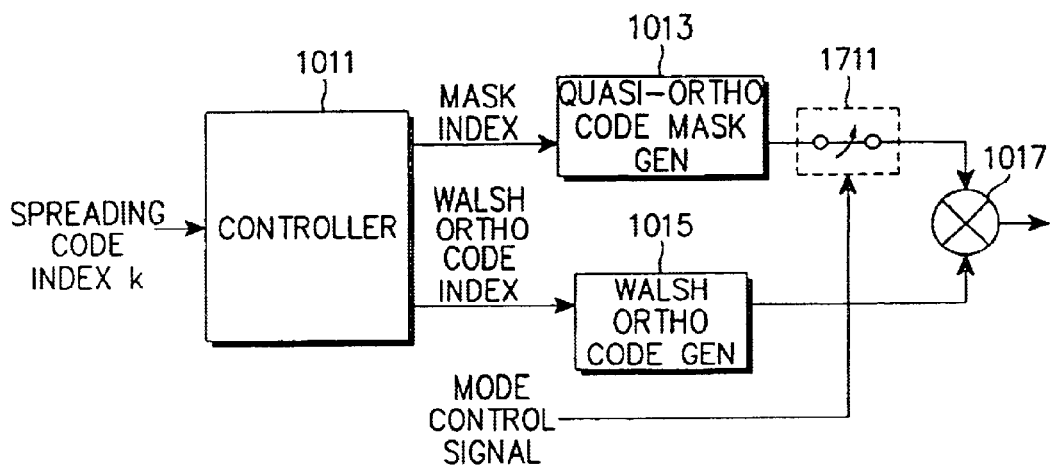
FIGS. 17 to 21 are block diagrams illustrating modified orthogonal code spreading devices capable of either a BPSK or QPSK mode according to a second embodiment of the present invention.

Referring to FIG. 17, the spreading code generator, compared with FIG. 10, further includes a switch 1711 connected between the quasi-orthogonal code mask generator 1013 and the multiplier 1017. Therefore, when the BPSK mode control signal is generated, the switch 1711 is turned off so that a value '0' is applied to the multiplier 1017. Therefore, the spreading code generator outputs '0' for the spreading code. Accordingly, the multipliers 919 and 921 in FIG. 9 both output '0', so as to perform channel spreading in the BPSK mode. However, when the QPSK mode control signal is generated, the switch 1711 is turned on so that the output of the quasi-orthogonal code mask generator 1013 is applied to the multiplier 1017. Therefore, the multiplier 1017 generates the spreading code by multiplying the output of the Walsh orthogonal code generator 1015 by the quasi-orthogonal code mask. In this manner, it is possible to selectively perform channel spreading in the BPSK or QPSK mode.

Figure 18:
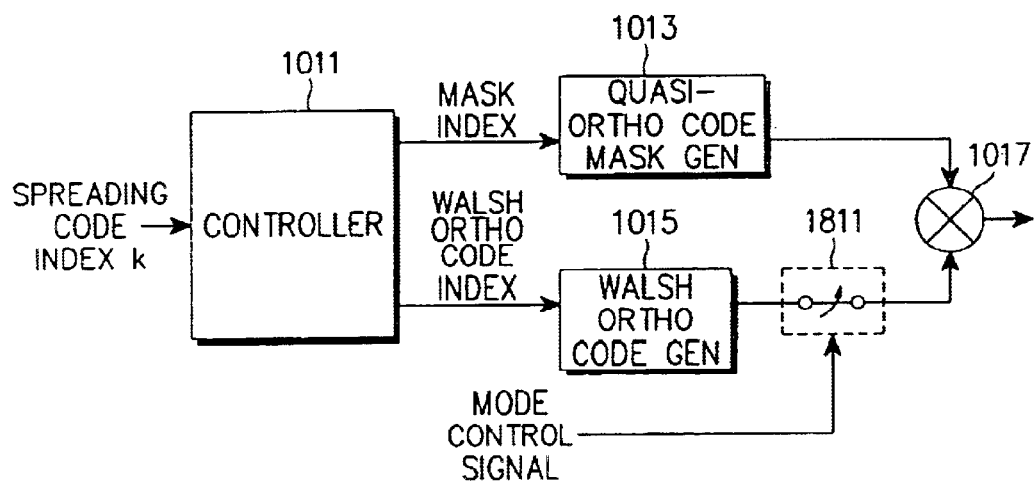

Referring to FIG. 18, the spreading code generator, compared with FIG. 10, further includes a switch 1811 connected between the Walsh orthogonal code generator 1015 and the multiplier 1017. Therefore, when the BPSK mode control signal is generated, the switch 1811 is turned off so that a value '0' is applied to the multiplier 1017. Therefore, the spreading code generator outputs '0' for the spreading code. Accordingly, the multipliers 919 and 921 in FIG. 9 both output '0', so as to perform channel spreading in the BPSK mode. However, when the QPSK mode control signal is generated, the switch 1811 is turned on so that the output of the Walsh orthogonal code generator 1015 is applied to the multiplier 1017. Therefore, the multiplier 1017 generates the spreading code by multiplying the output of the Walsh orthogonal code generator 1015 by the quasi-orthogonal code mask. In this manner, it is possible to selectively perform channel spreading in the BPSK or QPSK mode.

Figure 19:
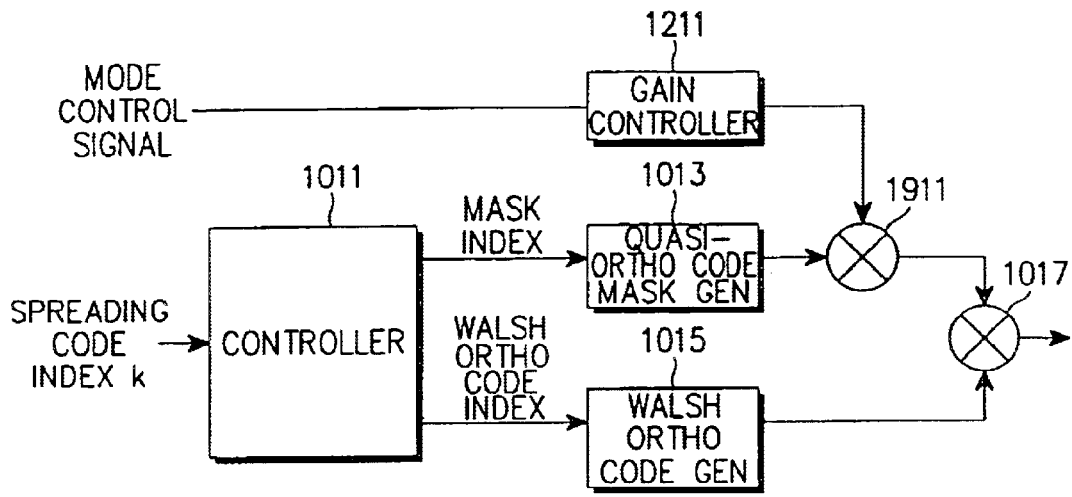

Referring to FIG. 19, the spreading code generator, compared with FIG. 10, further includes a multiplier 1911 connected between the quasi-orthogonal code mask generator 1013 and the multiplier 1017, and a gain controller 1211 for providing a gain control signal to the multiplier 1911 according to the mode control signal. Therefore, when the BPSK mode control signal is generated, the gain controller 1211 outputs '0' and thus, the multiplier 1911 also outputs '0'. As a result, the multiplier 1017 outputs '0' for the spreading code. Accordingly, the multipliers 919 and 921 in FIG. 9 both output '0', so as to perform channel spreading in the BPSK-mode. However, when the QPSK mode control signal is generated, the gain controller 1211 outputs '1' and thus, the multiplier 1911 provides the quasi-orthogonal code mask output form the quasi-orthogonal code mask generator 1013 to the multiplier 1017. Therefore, the multiplier 1017 generates the spreading code by multiplying the output of the Walsh orthogonal code generator 1015 by the quasi-orthogonal code mask. In this manner, it is possible to selectively perform channel spreading in the BPSK or QPSK mode.

Figure 20:
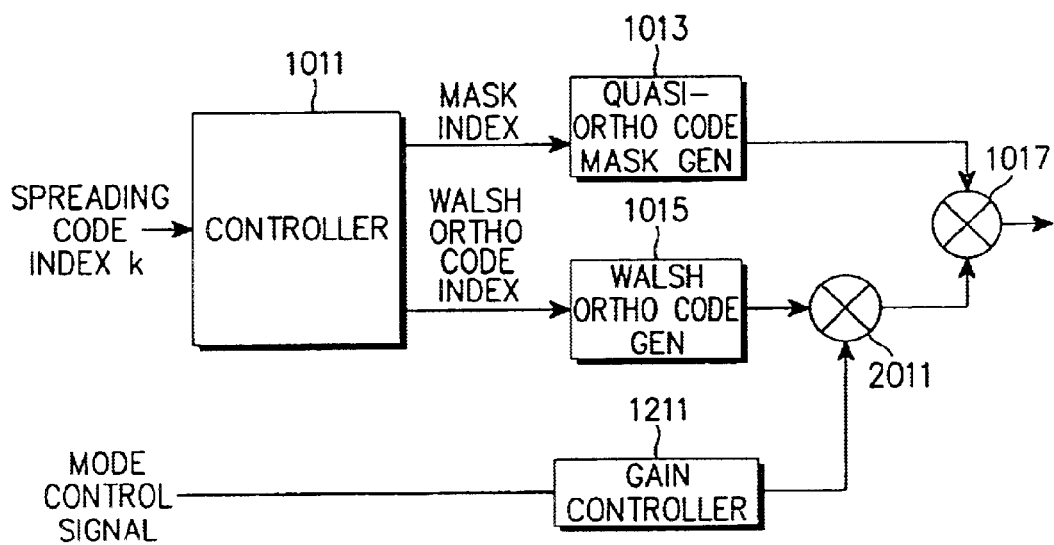

Referring to FIG. 20, the spreading code generator, compared with FIG. 10, further includes a multiplier 2011 connected between the Walsh orthogonal code generator 1015 and the multiplier 1017, and a gain controller 1211 for providing a gain control signal to the multiplier 2011 according to the mode control signal. Therefore, when the BPSK mode control signal is generated, the gain controller 1211 outputs '0' and thus, the multiplier 2011 also outputs '0'. As a result, the multiplier 1017 outputs '0' for the spreading code. Accordingly, the multipliers 919 and 921 in FIG. 9 both output '0', so as to perform channel spreading in the BPSK mode. However, when the QPSK mode control signal is generated, the gain controller 1211 outputs '1' and thus, the multiplier 2011 provides the Walsh orthogonal code output form the Walsh orthogonal code generator 1015 to the multiplier 1017. Therefore, the multiplier 1017 generates the spreading code by multiplying the output of the Walsh orthogonal code generator 1015 by the quasi-orthogonal code mask. In this manner, it is possible to selectively perform channel spreading in the BPSK or QPSK mode.

Figure 21:
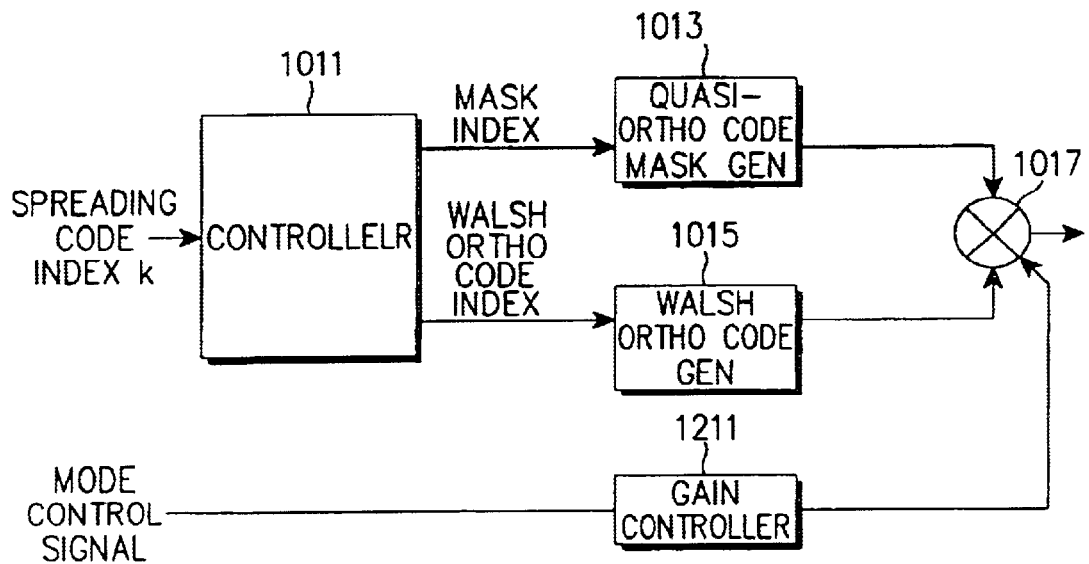

Referring to FIG. 21, the spreading code generator, compared with FIG. 10, further includes a gain controller 1211 for providing a gain control signal to the multiplier 1017 according to the mode control signal. Therefore, when the BPSK mode control signal is generated, the gain controller 1211 outputs '0' and thus, the multiplier 1017 also outputs '0' for the spreading code. Accordingly, the multipliers 919 and 921 in FIG. 9 both output '0', so as to perform channel spreading in the BPSK mode. However, when the QPSK mode control signal is generated, the gain controller 1211 outputs '1', so that the multiplier 1017 generates the spreading code by multiplying the output of the Walsh orthogonal code generator 1015 by the quasi-orthogonal code mask. In this manner, it is possible to selectively perform channel spreading in the BPSK or QPSK mode.

In FIGS. 12, 14 and 19 to 21 in which BPSK and QPSK orthogonal spreading is performed using the gain controller and the multiplier as described above, when the mode controller 600 generates the mode control signal having the value '0' for the BPSK mode and the mode control signal having the value '1' for the QPSK mode, there are not required a separate gain controller. That is, it is possible to form the BPSK or QPSK path by directly providing the mode control signal to the corresponding multiplier.

Figure 22:
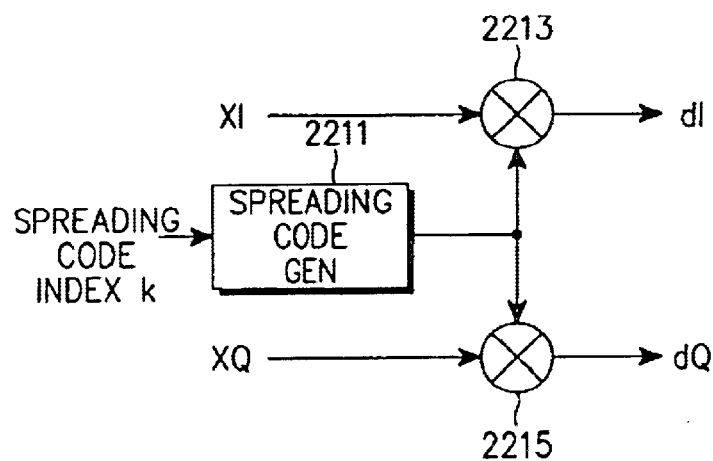
FIG. 22 is a diagram illustrating an orthogonal despreader using BPSK demodulation in a channel receiving device for a CDMA communication system according to a first embodiment of the present invention.

FIG. 22 shows a channel despreader 500 of FIG. 5.

Referring to FIG. 22, a spreading code generator 2211 having a spreading code table, generates a spreading code corresponding to an input spreading code index k. A multiplier 2213 multiplies the channel spread input signal XI by the generated spreading code to generate a channel despread I-channel signal dI. A multiplier 2215 multiplies the channel spread input signal XQ by the generated spreading code to generate a channel despread Q-channel signal dQ.

With regard to operation of the channel despreader 500 using BPSK modulation, the input signals XI and XQ are input to the multipliers 2213 and 2215, respectively. At the same time, the spreading code index k for designating a specific spreading code is input to the spreading code generator 2211. Then, the spreading code generator 2211 generates a spreading code corresponding to the spreading code index k and provides the generated spreading code to the multipliers 2213 and 2215. The multiplier 2213 then multiplies the despread input signal XI by the spreading code to generate a channel despread signal dI, and the multiplier 2215 multiplies the input signal XQ by the spreading code to generate a channel despread signal dQ.

Figure 23:
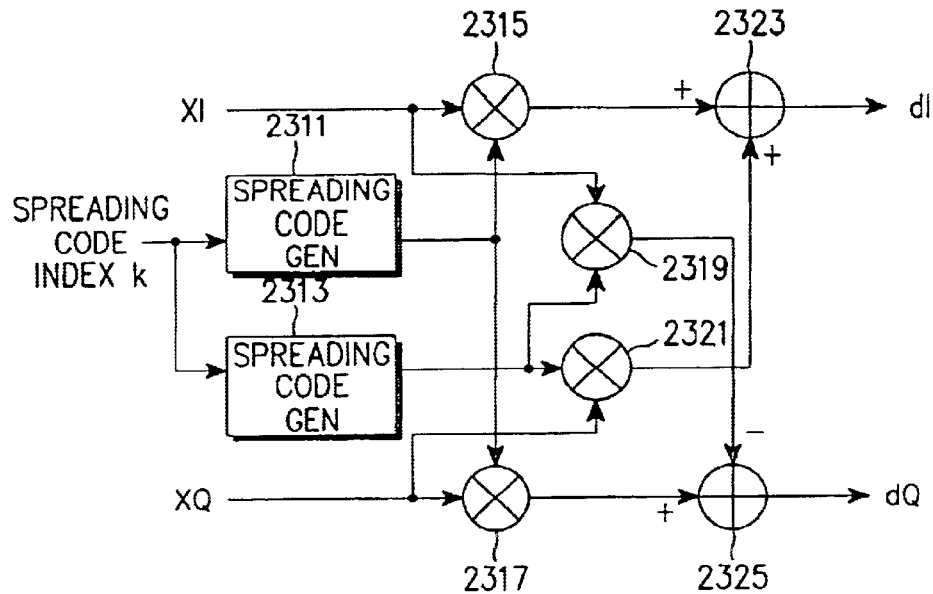
FIG. 23 is a diagram illustrating an orthogonal despreader using QPSK demodulation in a channel receiving device for a CDMA communication system according to a first embodiment of the present invention.

FIG. 23 shows the channel despreader 321 in the QPSK channel receiver of FIG. 3, wherein the channel despreader 321 has the same structure and operation as the channel spreader of FIG. 9 except the adders 2323 and 2325.

Referring to FIG. 23, first and second spreading code generators 2311 and 2313 receive the spreading code index k and generate a first spreading code and a second spreading code, each corresponding to the spreading code index k. Here, the first and second spreading codes output from the first and second spreading code generators 2311 and 2313 are the I-component spreading code and the Q-component spreading code, respectively. A multiplier 2315 multiplies the orthogonally spread input signal XI by the first spreading code generated from the first spreading code generator 2311, and a multiplier 2317 multiplies the input signal XQ by the first spreading code generated from the first spreading code generator 2311. It can be understood that the structure comprised of the first spreading code generator 2311 and the multipliers 2315 and 2317 is identical to the BPSK channel despreader of FIG. 22. A multiplier 2319 multiplies the input signal XI by the second spreading code output from the second spreading code generator 2313, and a multiplier 2321 multiplies the input signal XQ by the second spreading code output from the second spreading code generator 2313. An adder 2323 adds an output of the multiplier 2321 to an output of the multiplier 2315 to generate a channel despread output signal dI. An adder 2325 subtracts an output of the multiplier 2319 from an output of the multiplier 2317 to generate a channel despread output signal dQ.

FIGS. 24 to 27 show modified channel despreaders which supports both the BPSK and QPSK modulation by using switches or controlling a gain of the input signal to disconnect or connect the Q-component spreading code.

Figure 24:
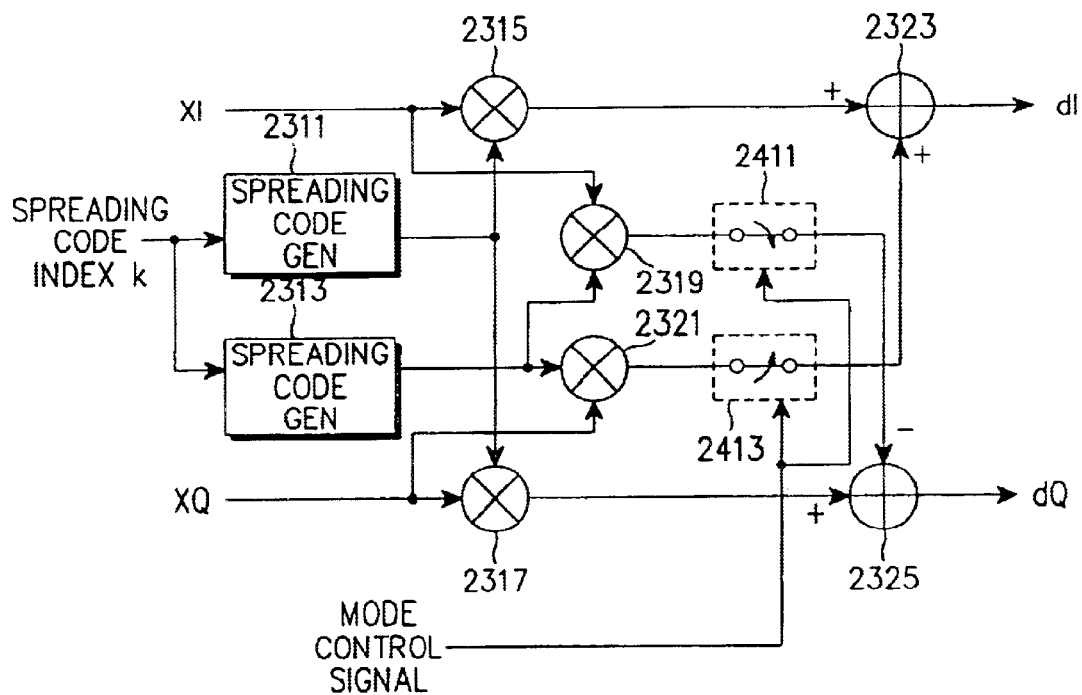
FIGS. 24 to 27 are diagrams illustrating orthogonal despreading devices for performing BPSK or QPSK mode of orthogonal despreading according to a second embodiment of the present invention.

Referring to FIG. 24, the channel despreader has the same structure as the QPSK channel despreader of FIG. 23 except for the scheme of selecting a BPSK path or a QPSK path according to the mode control signal transmitted from the base station together with the channel assignment message. That is, the channel despreader of FIG. 24 further includes a switch 2411 interposed between the multiplier 2319 and the adder 2325, being switching according to the mode control signal, and a switch 2413 interposed between the multiplier 2321 and the adder 2323, being switched according to the mode control signal. The switches 2411 and 2413 are simultaneously switched by the mode control signal.

With regard to operation of the channel despreader of FIG. 24, when the BPSK mode control signal is generated, the switches 2411 and 2413 are turned off so that the output signal of the multiplier 2319 and the output signal of the a multiplier 2321 are not applied to the adders 2325 and 2323. Therefore, the adder 2323 adds '0' to the output signal of the multiplier 2315, and the adder 2325 subtracts '0' from the output signal of the multiplier 2317. Accordingly, the output signals dI and dQ are output in the same manner as in the BPSK channel despreader of FIG. 22.

Alternatively, when the QPSK mode control signal is generated, the switches 2411 and 2413 connect the multipliers 2319 and 2321 to the adders 2325 and 2323, respectively so that the output signals of the multipliers 2319 and 2321 are applied to the adders 2325 and 2323, respectively. Therefore, the channel despreader serves as the QPSK channel despreader of FIG. 23.

Figure 25:
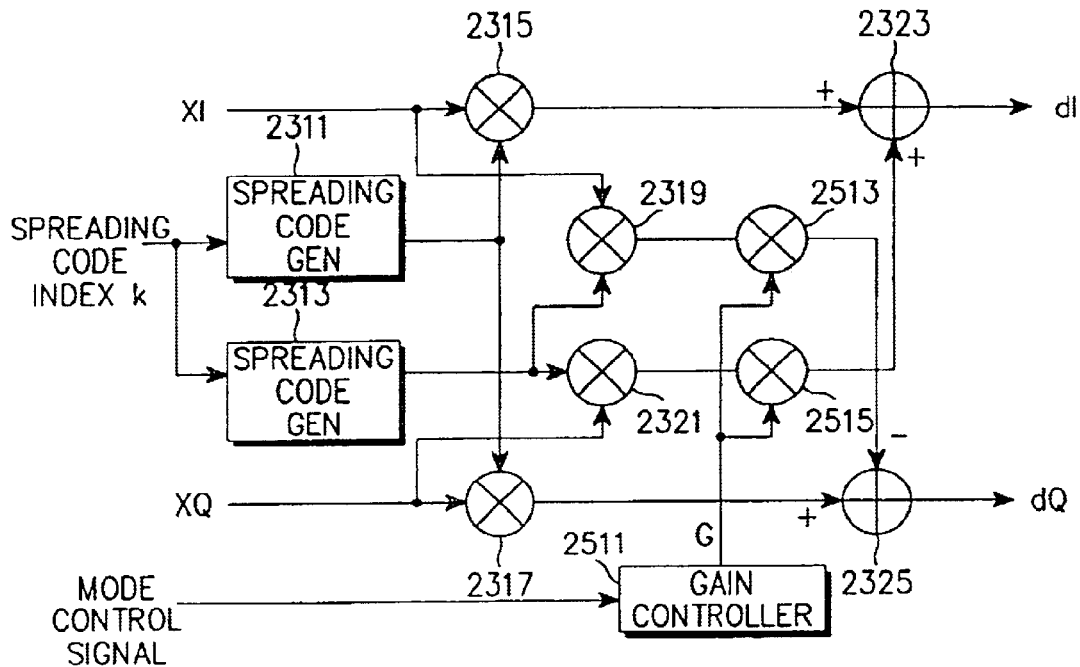

Referring to FIG. 25, the channel despreader has the same structure as the channel despreader of FIG. 23 except the scheme for selecting a BPSK path and a QPSK path according to the mode control signal transmitted from the base station together with the channel assignment message. In the channel despreader of FIG. 25, a gain controller 2511 generates a gain control signal having a first value for the BPSK mode and a second value for the QPSK mode according to the mode control signal transmitted from the base station. A multiplier 2513 connected between the multiplier 2319 and the adder 2325, controls an output gain of the multiplier 2319 according to the gain control signal.

A multiplier 2515 connected between the multiplier 2321 and the adder 2323, controls an output gain of the multiplier 2321 according to the gain control signal. The multipliers 2513 and 2515 are provided with the same gain control signal. When the gain control signal is '0', the Q-component signals output from the multipliers 2319 and 2321 are not applied to the adders 2325 and 2323. When the gain control signal is '1', the Q-component signals are applied to the adders 2325 and 2323.

With regard to operation of the channel despreader of FIG. 25, upon receipt of the BPSK mode control signal, the gain controller 2511 continuously outputs the gain control signal having the value '0' to the multipliers 2513 and 2515. Then, the multipliers 2513 and 2515 both generate the output signals of '0'. Therefore, the adder 2323 adds '0' to the despread signal output from the multiplier 2315 and the adder 2325 subtracts '0' from the despread signal output from the multiplier 2317. Accordingly, the output signals dI and dQ are output in the same manner as in the BPSK channel despreader of FIG. 22.

Alternatively, upon receipt of the QPSK mode control signal, the gain controller 2511 continuously outputs the gain control signal having the value '1' to the multipliers 2513 and 2515. Then, the multipliers 2513 and 2515 multiplies the gain control signal '1' by the despread signals output from the multipliers 2319 and 2321, respectively, so that the output signals of the multipliers 2513 and 2515 become identical to the output signals of the multipliers 2319 and 2321. The output of the multiplier 2513 is applied to the adder 2325 and the output of the multiplier 2515 is applied to the adder 2323. Then, the adder 2325 subtracts the output of the multiplier 2513 from the output of the multiplier 2317, to generate the channel despread signal dQ, and the adder 2323 adds the output of the multiplier 2515 to the output of the multiplier 2315, to generate the channel despread signal dI. Accordingly, the channel despread signals dI and dQ are output in the same manner as in the QPSK channel despreader of FIG. 23.

Figure 26:
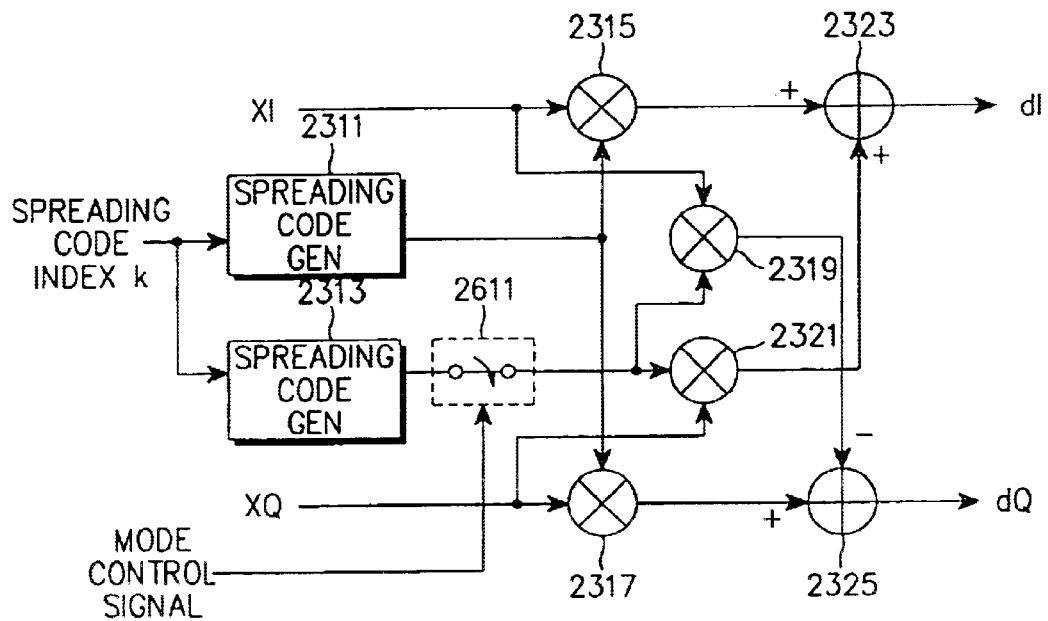

Referring to FIG. 26, the channel despreader has the same structure as the QPSK channel despreader of FIG. 23 except the scheme for selecting a BPSK path and a QPSK path according to the mode control signal transmitted from the base station together with the channel assignment message. That is, the channel despreader of FIG. 26 further includes a switch 2611 connected between the second spreading code generator 2313 and the multipliers 2319 and 2321, which is switched according to the mode control signal to control output of the Q-component spreading code.

With regard to operation of the channel despreader of FIG. 26, when the BPSK mode control signal is generated, the switch 2611 is switched off, so that an output path of the second spreading code generator 2313 is disconnected from the multipliers 2319 and 2321. Accordingly, the multiplier 2319 multiplies the input signal XI by '0' and outputs a resulting value '0' to the adder 2325. As a result, the adder 2325 outputs a value identical to the output value of the multiplier 2317. Similarly, the multiplier 2321 multiplies the input signal XQ by '0' and outputs a resulting value '0' to the adder 2323. As a result, the adder 2323 outputs a value identical to the output value of the multiplier 2315. Therefore, the final output values are identical to the output values in the BPSK channel despreader of FIG. 22.

Alternatively, when the QPSK mode control signal is generated, the switch 2611 is turned on, so that the Q-component spreading code generated from the second spreading code generator 2313 is normally applied to the multipliers 2319 and 2321. Thereafter, in the same process as in FIG. 23, the channel despreader generates the QPSK channel despread signals.

Figure 27:
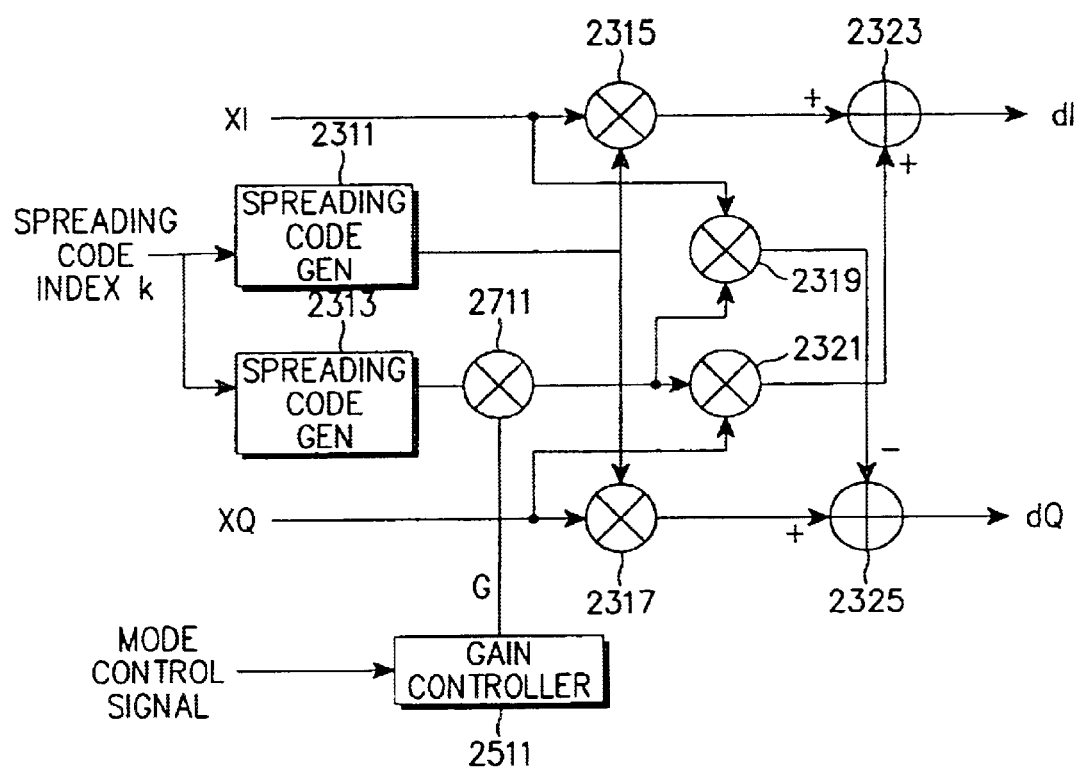

Referring to FIG. 27, the channel despreader has the same structure as the QPSK channel despreader of FIG. 23 except the scheme for selecting a BPSK path and a QPSK path according to the mode control signal transmitted from the base station together with the channel assignment message. That is, the channel despreader of FIG. 27 further includes a gain controller 2511 for generating a gain control signal according to the mode control signal, and a multiplier 2711 connected between the second spreading code generator 2313 and the multipliers 2319 and 2321, which controls output of the Q-component spreading code according to the mode control signal.

With regard to operation of the channel despreader of FIG. 27, when the BPSK mode control signal is generated, the gain controller 2511 generates the gain control signal having a value '0' according to the mode control signal. The multiplier 2711 then multiplies the output of the second spreading code generator 2313 by '0' so that an output path of the spreading code generator 2313 is disconnected from the multipliers 2319 and 2321. Accordingly, the multiplier 2319 multiplies the input signal XI by '0' and outputs a resulting value '0' to the adder 2325. As a result, the adder 2325 outputs a value identical to the output value of the multiplier 2317. Similarly, the multiplier 2321 multiplies the input signal XQ by '0' and outputs a resulting value '0' to the adder 2323. As a result, the adder 2323 outputs a value identical to the output value of the multiplier 2315. Therefore, the final output values are identical to the output values in the BPSK channel despreader.

Alternatively, when the QPSK mode control signal is generated, the gain controller 2511 generates the gain control signal having a value '1' according to the mode control signal. The multiplier 2711 then multiplies the output of the second spreading code generator 2313 by '1', so that the Q-component spreading code generated from the second spreading code generator 2313 is normally applied to the multipliers 2319 and 2321. Thereafter, in the same process as in FIG. 23, the channel despreader generates the QPSK channel despread signals.

In FIGS. 23 to 27, the spreading code generators 2311 and 2313 can be implemented as shown in FIG. 10. That is, the spreading code generators 2311 and 2313 each have a quasi-orthogonal code mask index table for generating a quasi-orthogonal code and a Walsh orthogonal code index table for generating a Walsh orthogonal code, and generate a corresponding Walsh orthogonal code or quasi-orthogonal code under the control of a undepicted controller. At this point, the channel despreader generates only the Walsh orthogonal code for the spreading code in the BPSK mode, and can generate the Walsh orthogonal code or the quasi-orthogonal code in the QPSK mode. The spreading code generators 2311 and 2313 have the tables shown in FIGS. 15 and 16.

In addition, the channel despreaders of FIGS. 23 to 27 internally select the BPSK or QPSK modulation mode to perform channel despreading. That is, in the BPSK mode of operation, the channel despreaders of FIGS. 23 to 27 disconnects the path of the imaginary-component spreading code output from the second spreading code generator 2313 and forms only the path of the real-component spreading code output from the first spreading code generator 2311. Further, in the QPSK mode of operation, the channel despreaders despread the received channel spread signals by using both the real-component and imaginary-component spreading codes generated from the first and second spreading code generators 2311 and 2313.

Furthermore, the channel despreaders can obtain the same results as in FIGS. 24 to 27 by controlling output of the second spreading code generator 2313. Therefore, when the second spreading code generator 2313 is constructed as shown in FIGS. 17 to 21, the channel despreaders can obtain the same results in performing BPSK and QPSK channel spreading.

Moreover, in the QPSK and BPSK channel despreaders of FIGS. 25, 27 and 19 to 21, which use the gain controller and the multiplier, when a mode controller of the mobile station (not shown in the figures) generates a mode control signal having the value '0' for the BPSK mode and a mode control signal having the value '1' for the QPSK mode, it is not required to use separate gain controllers. That is, it is possible to form the BPSK path or the QPSK path by directly applying the mode control signal to the corresponding multiplier.

As described above, when the base station and the mobile station use different channel spreading methods in a CDMA communication system, this novel channel spreader can select a corresponding channel spreading method according to the mode control signal. In particular, this novel channel spreader can support both the IS-95 channels and the IMT-2000 channels. In addition, it is possible to support both the QPSK mode channels and the BPSK mode channels in the IMT-2000 system, wherein the QPSK mode channels can use both Walsh orthogonal codes and the quasi-orthogonal codes.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A channel spreading device for a base station in a CDMA (Code Division Multiple Access) communication system, comprising:

a spreading code generator for generating a real-component spreading code and an imaginary-component spreading code corresponding to a designated channel spreading code index;

a circuit receiving a mode control signal, for disabling generation of the imaginary-component spreading code in a QPSK modulation mode when the received mode control signal indicates a BPSK (Binary Phase Shift Keying) modulation mode; and a complex multiplier receiving a channel signal, for complex multiplying the received channel signal by at least one spreading code to spread the channel signal.

2. The channel spreading device as claimed in claim 1, wherein the spreading code generator comprises:
- a controller for generating a quasi-orthogonal code mask index and a Walsh orthogonal code index corresponding to the designated channel spreading code index;
- a real-component spreading code generator for generating a real-component quasi-orthogonal code mask corresponding to the quasi-orthogonal code mask index, for further generating a real-component Walsh orthogonal code corresponding to the Walsh orthogonal code index, and for further generating a real-component channel spreading code by multiplying the real-component quasi-orthogonal code mask by the real-component Walsh orthogonal code; and
- an imaginary-component spreading code generator for generating an imaginary-component quasi-orthogonal code mask corresponding to the quasi-orthogonal code mask index, for further generating an imaginary-component Walsh orthogonal code corresponding to the Walsh orthogonal code index, and generating an imaginary-component channel spreading code by multiplying the imaginary-component quasi-orthogonal code mask by the imaginary-component Walsh orthogonal code.

3. The channel spreading device as claimed in claim 2, wherein the controller does not generate the quasi-orthogonal code mask index when the controller receives a channel spreading code index which designates a Walsh orthogonal code.

4. The channel spreading device as claimed in claim 2, wherein the circuit for disabling generation of the imaginary-component channel spreading code is connected to an output node of the imaginary-component spreading code generator.

5. The channel spreading device as claimed in claim 2, wherein the circuit for disabling generation of the imaginary-component channel spreading code is connected to output nodes of multipliers, in the complex multiplier, for multiplying the imaginary-component spreading code by the channel signal.

6. The channel spreading device as claimed in claim 2, wherein the circuit for disabling generation of the imaginary-component channel spreading code is disposed in the imaginary-component spreading code generator.

7. A channel despreading device for a mobile station in a CDMA communication system, comprising:
- a spreading code generator for generating a real-component spreading code and an imaginary-component spreading code corresponding to a designated channel spreading code index;
- a circuit receiving a mode control signal, for disabling generation of the imaginary-component spreading code in a QPSK modulation mode when the received mode control signal indicates a BPSK (Binary Phase Shift Keying) modulation mode; and
- a complex multiplier receiving a channel signal, for complex multiplying the received channel signal by the spreading codes to despread the channel signal.

8. A channel transmission device for a base station in a CDMA communication system, comprising:
- a demultiplexer receiving a mode control signal as a select signal, for outputting input channel symbols to one path when the received mode control signal is a BPSK (Binary Phase Shift Keying) mode control signal, and for separately outputting the input channel symbols to said one path and another path when the received mode control signal is a QPSK (Quadrature Phase Shift Keying) mode control signal;
- a channel spreader including:
  - a spreading code generator for generating a real-component spreading code and an imaginary-component spreading code corresponding to a designated channel spreading code index;
  - a circuit receiving a mode control signal, for disabling generation of the imaginary-component spreading code in a QPSK modulation mode when the received mode control signal indicates the BPSK mode; and
  - a complex multiplier receiving a channel signal, for complex multiplying the received channel signal by at least one spreading code to spread the channel signal; and
- a spreader for complex multiplying the channel spread signal by a real-component and an imaginary-component PN (Pseudo Noise) codes.

9. A channel receiving device for a mobile station in a CDMA communication system, comprising:
- a despreader receiving a channel signal transmitted from a base station, for complex multiplying the received channel signal by real-component and imaginary-component PN (Pseudo Noise) codes;
- a channel despreader including:
  - a spreading code generator for generating a real-component spreading code and an imaginary-component spreading code corresponding to a designated channel spreading code index;
  - a circuit receiving a mode control signal, for disabling generation of the imaginary-component spreading code in a QPSK modulation mode when the received mode control signal indicates a BPSK (Binary Phase Shift Keying) modulation mode; and
  - a complex multiplier receiving the despread signal, for complex multiplying the received signal by at least one spreading code to despread the received signal; and
- a multiplexer receiving a mode control signal as a select signal, for multiplexing the received channel symbols on one path and another path when the received mode control signal is a QPSK (Quadrature Phase Shift Keying) mode control signal.

10. A channel spreading method for a base station in a CDMA communication system having a spreading code generator for generating real-component and imaginary-component spreading codes, comprising the steps of:
- upon generation of a BPSK (Binary Phase Shift Keying) mode control signal, disabling generation of the imaginary-component spreading code in a QPSK modulation mode and multiplying a channel signal to be transmitted by the real-component spreading code to spread the channel signal; and
- upon generation of a QPSK (Quadrature Phase Shift Keying) mode control signal, complex multiplying the channel signal to be transmitted by the real-component spreading code and the imaginary-component spreading code to spread the channel signal.

11. A channel despreading method for a mobile station in a CDMA communication system having a spreading code generator for generating real-component and imaginary-component spreading codes, comprising the steps of:
- upon generation of a BPSK (Binary Phase Shift Keying) mode control signal, disabling generation of the imaginary-component spreading code in a QPSK modulation mode and multiplying a received channel signal by the real-component spreading code to despread the channel signal; and upon generation of a QPSK (Quadrature Phase Shift Keying) mode control signal, complex multiplying the received channel signal by the real-component spreading code and the imaginary-component spreading code to despread the channel signal.

12. A channel transmission method for a base station in a CDMA communication system having a spreading code generator for generating real-component and imaginary-component spreading codes, comprising the steps of:

receiving a mode control signal as a select signal, outputting input channel symbols to one path when the received mode control signal is a BPSK (Binary Phase Shift Keying) mode control signal, and separately outputting the input channel symbols to said one path and another path when the received mode control signal is a QPSK (Quadrature Phase Shift Keying) mode control signal;

upon generation of the BPSK mode control signal, disabling generation of the imaginary-component spreading code in a QPSK modulation mode and multiplying the received channel signal by the real-component spreading code to spread the channel signal;

upon generation of the QPSK mode control signal, complex multiplying the received channel signal by the real-component and imaginary component spreading codes to spread the channel signal; and complex multiplying the spread channel signal by real-component and imaginary-component PN (Pseudo Noise) codes to spread the channel signal.

13. A channel receiving method for a mobile station in a CDMA communication system having a spreading code generator for generating real-component and imaginary-component spreading codes, comprising the steps of:

receiving a channel signal transmitted from a base station and complex multiplying the received signal by real-component and imaginary-component PN codes to despread the received signal;

upon generation of a BPSK (Binary Phase Shift Keying) mode control signal, disabling generation of the imaginary-component spreading code in a QPSK modulation mode and multiplying the received channel signal by the real-component spreading code to despread the channel signal;

upon generation of a QPSK (Quadrature Phase Shift Keying) mode control signal, complex multiplying the received channel signal by the real-component and imaginary component spreading codes to despread the channel signal; and receiving a mode control signal as a select signal, and multiplexing the input channel symbols on one path and another path when the received mode control signal is the QPSK mode control signal.

* * * * *